(12) United States Patent
Sukumaran

(10) Patent No.: US 10,976,901 B1
(45) Date of Patent: Apr. 13, 2021

(54) METHOD AND SYSTEM TO SHARE INFORMATION

(71) Applicant: Sanjay Sanku Sukumaran, Dublin, CA (US)

(72) Inventor: Sanjay Sanku Sukumaran, Dublin, CA (US)

(*) Notice: Subject to any disclaimer, the term of this patent is extended or adjusted under 35 U.S.C. 154(b) by 121 days.

(21) Appl. No.: 16/011,403

(22) Filed: Jun. 18, 2018

(51) Int. Cl.
G06F 17/00 (2019.01)
G06F 3/0484 (2013.01)
G06F 3/0482 (2013.01)
G06F 16/958 (2019.01)

(52) U.S. Cl.
CPC .......... *G06F 3/0484* (2013.01); *G06F 3/0482* (2013.01); *G06F 16/958* (2019.01)

(58) Field of Classification Search
CPC ..... G06F 3/0484; G06F 16/958; G06F 3/0482
See application file for complete search history.

(56) References Cited

U.S. PATENT DOCUMENTS

| | | | | |
|---|---|---|---|---|
| 7,801,885 B1* | 9/2010 | Verma | ................. | G06F 16/9535 707/713 |
| 8,380,705 B2* | 2/2013 | Tong | ..................... | G06F 16/951 707/721 |
| 8,826,426 B1* | 9/2014 | Dubey | .................... | H04L 63/14 726/22 |
| 10,395,257 B2* | 8/2019 | Patterson | ............... | G06Q 30/02 |
| 10,509,827 B1* | 12/2019 | Pattan | ................ | H04N 21/4312 |
| 2009/0030919 A1* | 1/2009 | Brezina | ................... | G06F 40/14 |
| 2010/0095198 A1* | 4/2010 | Bultrowicz | ........... | G06F 40/169 715/234 |
| 2010/0251141 A1* | 9/2010 | Sabin | .................... | G06F 16/958 715/758 |
| 2012/0260201 A1* | 10/2012 | Ganesh | .............. | G06Q 30/0201 715/764 |
| 2013/0298038 A1* | 11/2013 | Spivack | ................ | G06F 3/0484 715/753 |
| 2015/0227276 A1* | 8/2015 | Batti | .................... | G06F 9/44526 715/235 |
| 2016/0019195 A1* | 1/2016 | Sultanik | ................ | G06F 16/958 715/202 |
| 2016/0085745 A1* | 3/2016 | Clark | .................... | G06F 40/211 704/9 |
| 2016/0162500 A1* | 6/2016 | Wilson | .................. | G06F 16/958 715/234 |
| 2017/0147691 A1* | 5/2017 | Li | .......................... | G06F 16/36 |
| 2017/0193581 A1* | 7/2017 | Vasthimal | ......... | G06F 16/24578 |
| 2017/0249384 A1* | 8/2017 | Kandylas | .............. | G06F 16/334 |
| 2018/0091546 A1* | 3/2018 | Davidson | ............ | G06F 16/9566 |

* cited by examiner

*Primary Examiner* — Mohammed H Zuberi
(74) *Attorney, Agent, or Firm* — Adibi IP Group, PC; Andrew C. Palmer; Amir V. Adibi

(57) ABSTRACT

A smart commenting platform that receives a plurality of content segments from users and extracts important attributes that among the plurality of content segments. The system presents to users multiple content segments and their respective attributes at the same time in a visually engaging manner. The attributes are dynamically weighed and displayed for users to easily review and efficiently provide commentary on. The system is capable of visually linking common attributes which promotes a better understanding of multiple concepts without having to navigate to multiple websites. The system allows users to easily add opinions, comments, and observations to topical matters. The system also allows users to customize the interface to their preference.

20 Claims, 21 Drawing Sheets

SNIPPETS VIEW USER INTERFACE (ARTICLE 1)

USER SYSTEM

VIRTUAL NEWS ANALYSIS SYSTEM

PROFILE USER INTERFACE

FILTER USER INTERFACE

ADD ARTICLE USER INTERFACE

ADD OPINION TO ARTICLE USER INTERFACE

SNIPPETS VIEW USER INTERFACE (ARTICLE 1)

PERSPECTIVE VIEW USER INTERFACE

ALTERNATIVE EMBODIMENT FOR PERSPECTIVE VIEW
USER INTERFACE

VISUAL DISPLAY OF AN EXAMPLE OF A FIRST CONTENT SEGMENT WITH A PLURALITY OF SELECTABLE ATTRIBUTES (ARTICLE 1)

VISUAL DISPLAY AN EXAMPLE OF A SECOND CONTENT SEGMENT WITH A PLURALITY OF SELECTABLE ATTRIBUTES (ARTICLE 7)

VISUAL DISPLAY OF POP-UP WINDOWS (ARTICLE 1)

VISUAL DISPLAY OF THE ARTICLE VIEW (ARTICLE 1)

VISUAL DISPLAY SHOWING A USER SELECTED COMMON ATTRIBUTE
VISUALLY AND DYNAMICALLY LINKING A FIRST CONTENT SEGMENT
TO A SECOND CONTENT SEGMENT

SNIPPETS VIEW USER INTERFACE WITH ANOTHER ARTICLE

MULTIPLE ARTICLES LINKED BY COMMON ATTRIBUTE ON USER INTERFACE

LINK ARTICLE USER INTERFACE

EXAMPLE OF LINKED ARTICLES ON USER INTERFACE

SUGGEST A NEW ATTRIBUTE USER INTERFACE

EXAMPLE OF ANOTHER ARTICLE (ARTICLE 2)
WITH GENERATED ATTRIBUTES

GRAPHICAL REPRESENTATION OF SELECTABLE ATTRIBUTES
(ARTICLE 2)

WEIGHTED DISPLAY OF SELECTABLE ATTRIBUTES

TEMPORAL OF SELECTABLE ATTRIBUTES

STATE VIEW OF SELECTABLE ATTRIBUTES

PROCESS OF CATEGORIZING USER CREATED ATTRIBUTES AS SYSTEM GENERATED ATTRIBUTES

ANOTHER EMBODIMENT – PRODUCT REVIEWS

ANOTHER EMBODIMENT – POLLING

CREATE ARTICLE FLOWCHART

ARTICLE FEEDBACK FLOWCHART

REPORT ARTICLE INTERFACE

VIEW & SUGGEST NEW THEMES INTERFACE

VIEW & SUGGEST NEW THEMES RESPONSE INTERFACE

METHOD AND SYSTEM TO SHARE INFORMATION

TECHNICAL FIELD

The described embodiments relate to a smart commenting platform, and more particularly commenting platforms that visually and dynamically display information in response to user input.

BACKGROUND INFORMATION

Since its inception, the internet has been a conduit for people to share information, ideas, and opinions with each other. Currently, there are various websites that allow people to share information with each other, and allow those people to view and comment on the respective website. These platforms are lackluster in that the display is minimal and does not provide users with a unique visualization of other people's ideas, observations, or insights. As a result, users are unable to easily view contrasting opinions regarding topical matters. A solution is desired that displays information in a way as to help educate users on other people's ideas, observations, insights, or important facts regarding highly topical matters.

SUMMARY

A smart commenting platform is provided onto a desktop browser or mobile browser. The platform is capable of taking multiple users' observations, opinions and emotions (or feelings) on a topical matter and associate them with themes, concepts and entities extracted from the topical matter. The platform presents these attributes in a visually engaging manner that promotes better understanding of the topical matter. This is done by helping users make better informed decisions by making available viewpoints and details that might not be apparent when viewing the topical matter in isolation or with much fewer/less sophisticated associations that are available on other publishing platforms available currently.

The platform captures user classifications, observations, opinions, and emotions on topical matters and visually and dynamically presents them in an engaging manner around a user selected article. The platform enables users to choose articles (using a URL) and save them to a database along with observations, opinions, and emotions as content attributes. In addition, a user may agree or disagree with content attributes of other users as well as suggest their own content attributes.

The platform will filter out and/or display more prominently the content attributes that are more commonly shared among users commenting on the content (i.e. —the size of the bubble and typograph used to display the content attributes is proportional to the amount of user interest and activity on them). The platform extracts concepts and entities from topical matters and presents them in a visually engaging manner around the content. Once a user saves content along with selected content attributes, the system uses a third-party API to extract the concepts and entities that are most relevant to the content and saves it along with the content. The system will display concepts and entities along with user entered observations, opinions, and emotions. The concepts and entities with higher relevancy scores will be shown more prominently (i.e. —the size of the bubble and typograph used to display the content attributes is proportional to the relevancy score).

The platform will make commenting more useful by illustrating information and user observations in a structured cohesive format. As a result, the system is designed to provide people with better insights and predictions, enabling users to make more informed decisions regarding topical matters.

One novel aspect of the system is that it visually and dynamically displays content such that a user can more easily view multiple opinions, ideas, and important facts regarding topics. This helps people have a broader perspective of ideas, rather than focusing merely on their own ideas. The system is designed such that the information displayed is not limited to news articles but can be used for a multitude of purposes (e.g. —product reviews or other general content).

Behind the platform is a system that collects and analyzes observation data while also being able to display such data in a useful unique user interface for the user. This will help drive future insights from the data collected on the platform.

Further details and embodiments and methods are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
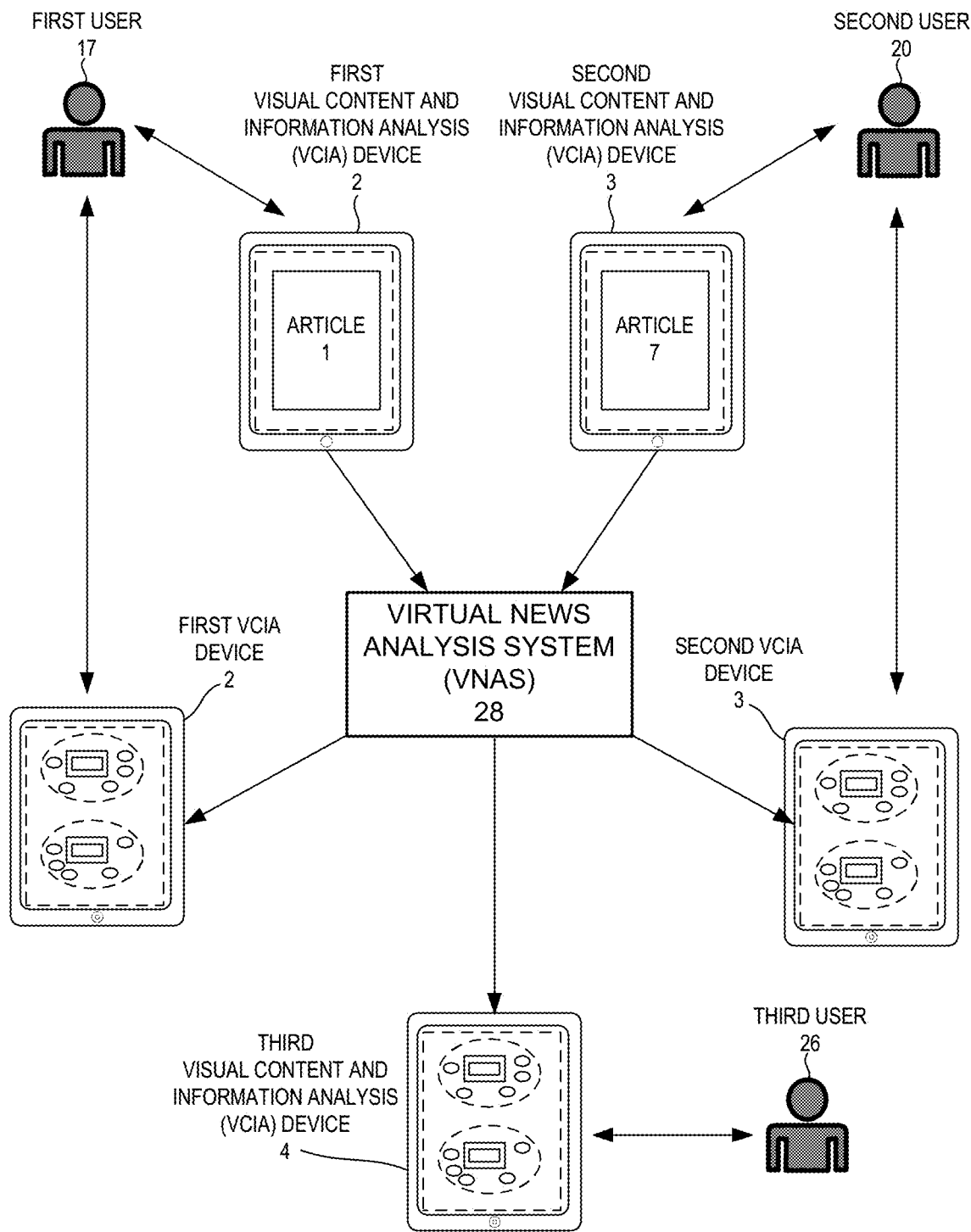
FIG. 1 shows user interaction with a Virtual News Analysis System (VNAS).

FIG. 1 shows user interactions with a Virtual News Analysis System (VNAS). A first user 17 interacts with a first Visual Content and Information Analysis (VCIA) Device 2. The first user 17 enters an external link to a first article (Article 1). A second user 20 interacts with a second VCIA Device 3. The second user 20 enters an external link to a second article (Article 7).

The VNAS 28 processes the information from the first VCIA device 2 and the second VCIA device 3 entered by the first user 17 and the second user 18, respectively. The VNAS 28 visually and dynamically displays a first amount of content having a first plurality of attributes (user and system generated) and a second amount of content having a second plurality of attributes (user and system generated) on the first VCIA device 2, the second VCIA device 3, and a third VCIA device 4.

A third user 26 can interact with the third VCIA device 4 to easily see the first amount of content with its first plurality of attributes and the second amount of content with its second plurality of attributes. The first user 17 can interact with the third VCIA device 2 to see the first amount of content with its first plurality of attributes and the second amount of content with its second plurality of attributes. The second user 20 can interact with the second VCIA device 3 to see the first amount of content with its first plurality of attributes and the second amount of content with its second plurality of attributes. The VNAS 28 visually and dynamically displays information for multiple users to see in an easy to read, organized manner.

Figure 2:
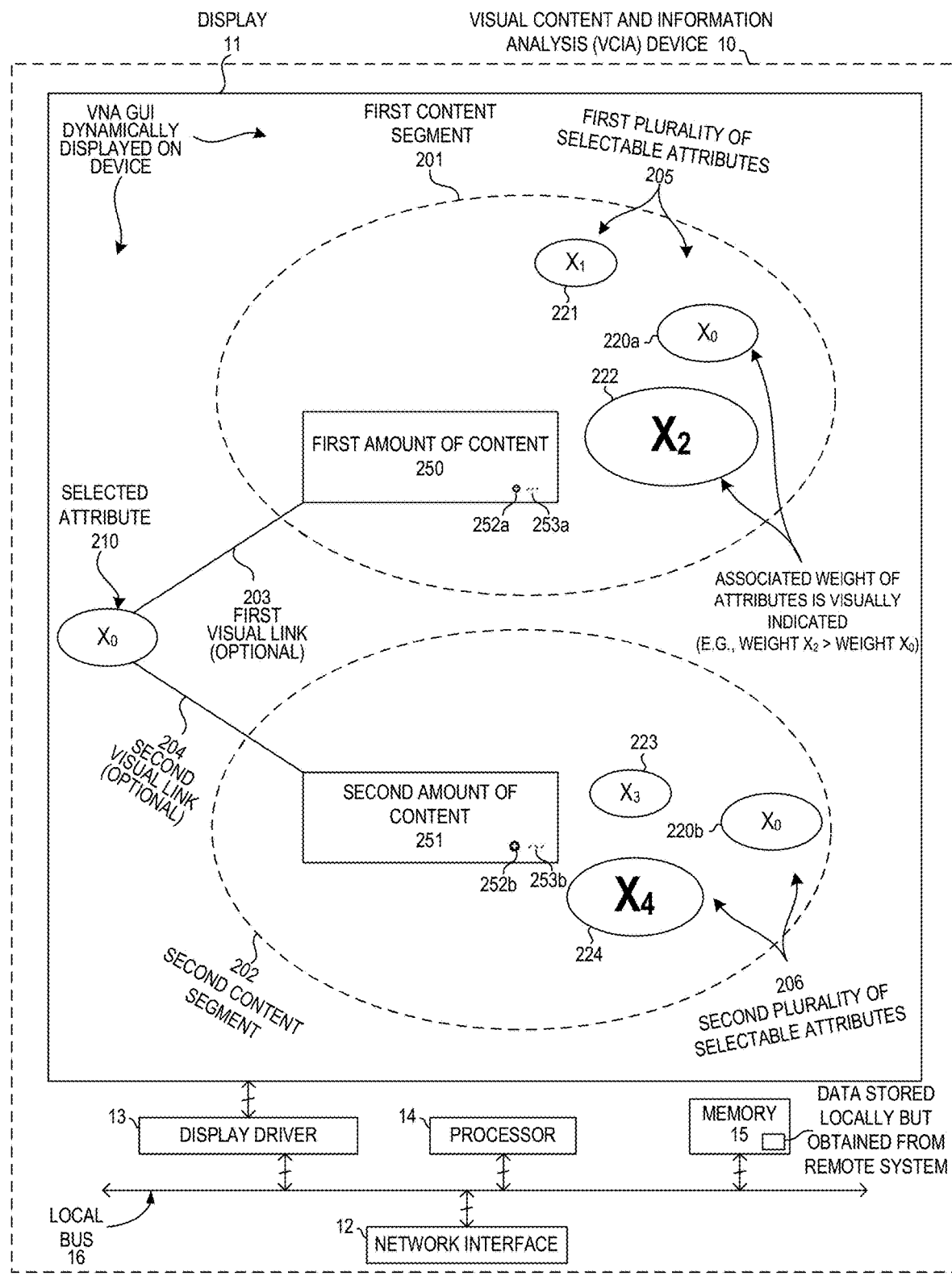
FIG. 2 is a Visual Content and Information Analysis (VCIA) device.

FIG. 2 is a Visual Content and Information Analysis (VCIA) device. A VCIA device 10 has a display 11, a network interface 12, a display driver 13, a processor 14, a memory 15, and a local bus 16. The processor 14 communicates with display driver 13, memory 15, and network interface 12 via the local bus 16. The display driver 13 is coupled to the display 11 via the local bus 16. The processor 14 controls the display driver 13 to present a Graphical User Interface (GUI) on the display 11. The processor 14 is configured to read and write to memory 15 across the local bus 16. The processor 14 is configured to communicate with a remote Visual News Analysis System (VNAS) over a network via the network interface 12.

In one example, the processor 14 executes an Internet browser application and causes a browser GUI to be rendered on the display 11. The rendered browser GUI has a URL input field. The user of the VCIA device 10 enters a URL into the URL input field of the browser GUI rendered on the display 11. In response, the browser generates an HTTP request that is communicated via the network interface 12 to the VNAS over the network. The VNAS responds by sending a markup language document, such as a Hyper-Text Markup Language (HTML) document, to the browser. The browser loads the HTML document and presents a VNA GUI on the display of the VCIA device 10. The VNA GUI dynamically displays content segments on the display 11. In this example, each content segment represents a news article that is accessible via the Internet. The VNA GUI that is shown on the display 11 is explained in further detail below.

In accordance with one novel aspect, each content segment comprises an amount of content and a plurality of selectable attributes. In the example shown in FIG. 2, a first content segment 201 comprises the first amount of content #1 250 and a first plurality of attributes 205. A second content segment 202 comprises the second amount of content #2 251 and a second plurality of attributes 206. The first plurality of attributes 205 comprises attributes $X_0$ 220a, $X_1$ 221, and $X_2$ 222. The second plurality of attributes 206 comprises attributes $X_0$ 220b, $X_3$ 223, and $X_4$ 224.

Each amount of content comprises an amount of text, an associated graphical element, and a hyperlink to an external webpage derived from information a user selected link. The system communicates with a third-party API which from the link provided by the user extracts the title, author, images/video, and text from the article. The collected information is then stored in the system and then displayed on the interface. In addition, each amount of content has an add your opinion button 252 which navigates the user to the add an opinion to article interface (see FIG. 7). In this example, the first amount of content 250 has an add opinion article 252a and the second amount of content 251 has an add opinion article 252b. In another embodiment the add your opinion button is an "add your opinion" link (see FIG. 16). Each amount of content also has an expand button 253 which expands the amount of content shown on the interface (see FIG. 11 for unexpanded view and FIG. 14 for expanded view). In this example, the first amount of content 250 has an expand button 253a and the second amount of content has an expand button 253b.

Each of the plurality of attributes comprises text overlaid above a shape. The size and typography of the text is predetermined by the system. The system determines the size and typography based in part on an associated weight that is assigned to the attribute. The attributes characterize at least one aspect of the content associated with the content segment. For example, if the content segment pertains to a professional athlete, then one of the attributes will have text related to the particular sport of the professional athlete. The text, shape, and color are system generated based on either user provided information or system extracted information (see FIG. 26). In this example, user generated attributes appear on the left of the amount of content and system extracted attributes appear on the right.

Moreover, the example shown in FIG. 2 has a selected attribute 210. The selected attribute 210 in this example is an attribute, $X_0$ (220a and 220b), that is common between the first plurality of selectable attributes 205 and second plurality of selectable attributes 206. In response to the user's selection (by double-clicking on the selectable attribute), selected attribute 210 is visually and dynamically associated to content segment #1 250 via a first visual link (optional) 203 and content segment #2 251 via a second visual link (optional) 204. The visual links 203 and 204 are optional and in another example, a different type of association method can be used to link the amount of contents (250 and 251) to the selected attribute 210. In another example, there are multiple common attributes which overlap each content segment. In yet another example, there are at least two visual links that are visually and dynamically linked from the selected attribute 210 to their respective contents.

Additionally, FIG. 2 illustrates the various weight of attributes is visually indicated. In this example, the weight of content attribute $X_2$ 222 is greater than the weight of content attribute $X_0$ 220a as shown by its larger size and different typography. Furthermore, the weight of content attribute $X_4$ 224 is also greater than the weight of content attribute $X_0$ 220b.

Figure 13:
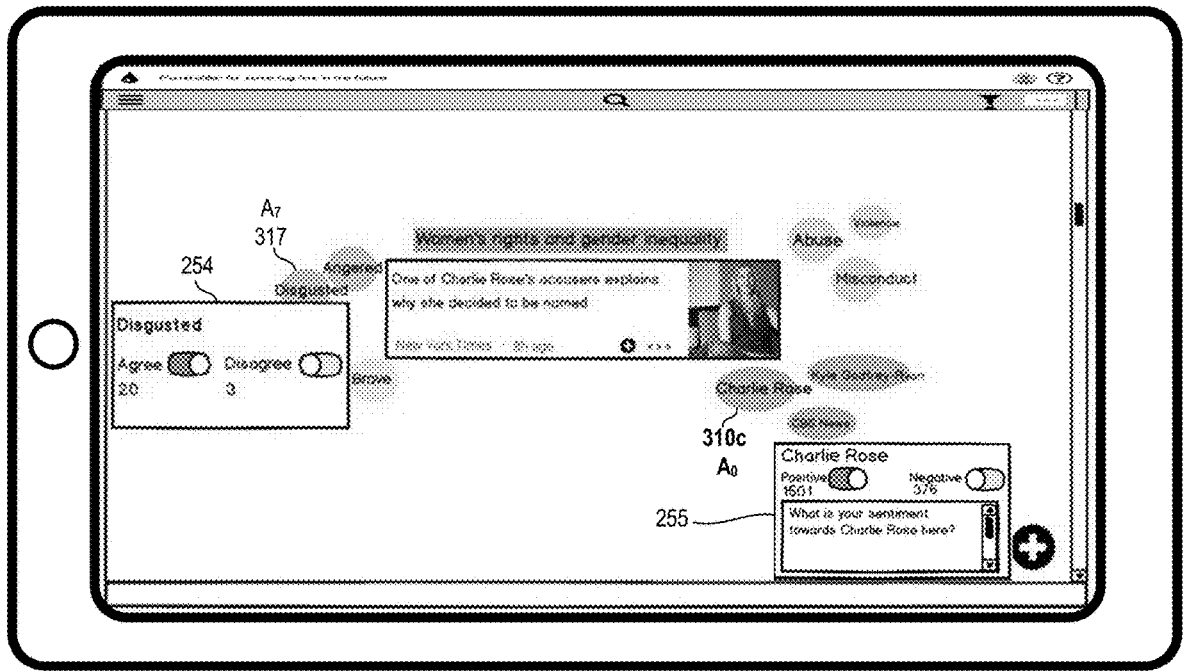
FIG. 13 is a visual display of pop-up windows (Article 1).

For user generated attributes, after the system assigns a weight to a content attribute, the weight will increase or decrease depending on the user input on the count of the number of "agree" or "disagree" that attribute receives, respectively (see FIG. 13). For system generated attributes, the system will assign a weight to a content attribute based on the attribute's relevance to the particular amount of content in relation to other system generated attributes with respect to the same amount of content.

Figure 3:
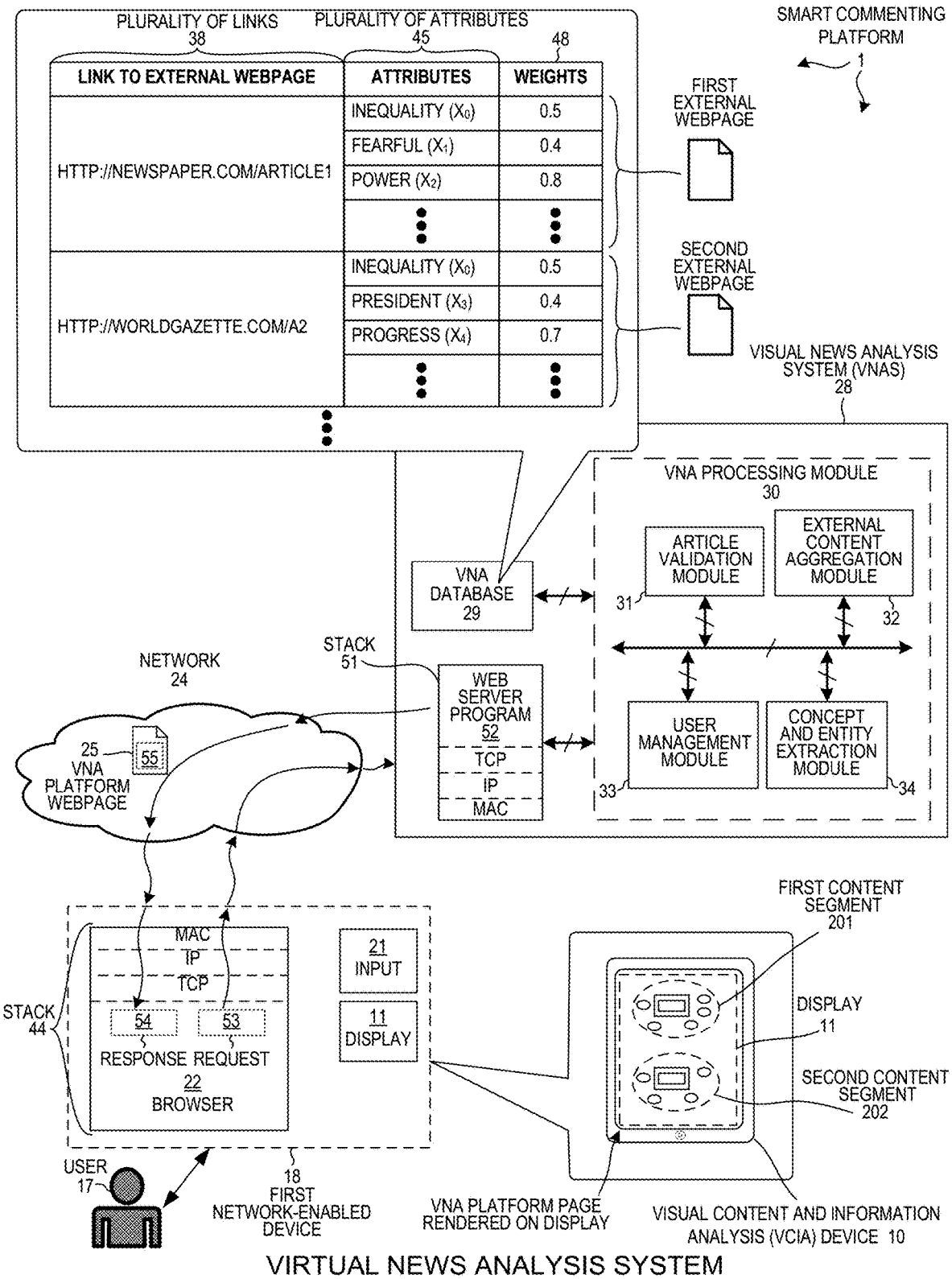
FIG. 3 shows a Virtual News Analysis System (VNAS).

FIG. 3 shows a Virtual News Analysis System (VNAS). A first user 17 utilizes a smart commenting platform 1 to interact with the VNAS 28. The smart commenting platform 1 includes a first network-enabled device 18 and a Virtual News Analysis System (VNAS) 28. The smart commenting platform 1 is designed allows users to easily enter information while still having the capability to visually display information for users to review efficiently without having to navigate to multiple external websites. The smart commenting platform 1 provides one site where users can view each other's opinions, thereby reducing the time and effort required to review multiple sources of information.

The VNAS 28 includes a Visual News Analysis (VNA) database 29, a VNA processing module 30, and a stack 51. The VNA processing module 30 has an article validation module 31, an external content aggregation module 32, a user management module 33, and a concept and entity extract module 34.

The first network-enabled device 18 communicates with the VNAS 28 via Hypertext Transfer Protocol (HTTP) using a network 24. The network-enabled device 18 is a mobile communication handset, a tablet computer, a desktop computer, a laptop computer, or any device capable of communicating with an application server.

The network-enabled device 18 is operated by a user 17. The network-enabled device 18 executes a stack 44 of protocol processing layers including a MAC layer, an IP layer, a TCP layer and an application layer. The application layer in this case includes an HTTP browser 22 application layer program. The network-enabled device 18 includes a display 11 and an input device 21, such as a keyboard, a touch screen, or a microphone. The stack 51 of protocol processing layers executes on the VNAS 28, where an HTTP web server program 52 is one of the application layer programs.

The VNAS 28 is realized according to the MEAN (MongoDB, Express.js, AngularJS, and Node.js) framework. In another example, the framework is a LAMP (Linux, Apache HTTP Server, MySQL, and PHP) framework. In another example, the HTTP web server program 52 is realized in ruby instructions using the Ruby on Rails framework, in python instructions using the Django framework, in JavaScript instructions using the node.js framework, or in Java instructions using the Enterprise JavaBeans (EJB) framework. Because frameworks change over time, the system is not limited to a single type of framework.

In response to the HTTP request 53, the VNAS 28 returns an HTTP response 54 to the network-enabled device 18. The VNA platform webpage 25 contains an amount of JavaScript code 55 causing a plurality of User Interface (UI) elements (e.g. —a first content segment 201 and a second content segment 202) to be rendered on display 11 of the network-enabled device 18. The first user 17 can enter data using the input device 21.

The VNAS 28 stores information entered by the user 17 in the VNA database 29. In one example, the VNA database 29 stores a plurality of links 38, a plurality of attributes 5, and a plurality of associated weights 48. Each of the plurality of links 38, plurality of attributes 45, and plurality of associated weights 48 corresponds to an external webpage (e.g. —a first external webpage and a second external webpage).

The article validation module 31 determines whether or not the user submitted article is a genuine news article. In one example, the article validation module 31 determines whether the parsed content includes certain characteristics that tend to indicate that the web page corresponds to a genuine news article. These characteristics may be supplied by a third-party, by an entity that manages the VNAS 28, or by developing a statistical model by processing a significant number of genuine articles and comparing the statistical model to the submitted HTML article. In another example, the article validation module 31 forwards the submitted HTML article to an external user or external third-party system and receives a response that indicates whether or not the article is genuine.

The external content and aggregation module 32 parses an HTML web page that corresponds to a news article that is submitted by a user onto the VNAS 28. The external content and aggregation module 32 extracts article content from the HTML webpage submitted by the user. The article content includes text, images, audio, and video content.

The user management module manages 33 user information and is used by the VNAS to support user authentication, sessions, and logging.

The concept and entity extraction module 34 is configured to identify concept information and entity information in an HTML web page.

Figure 4:
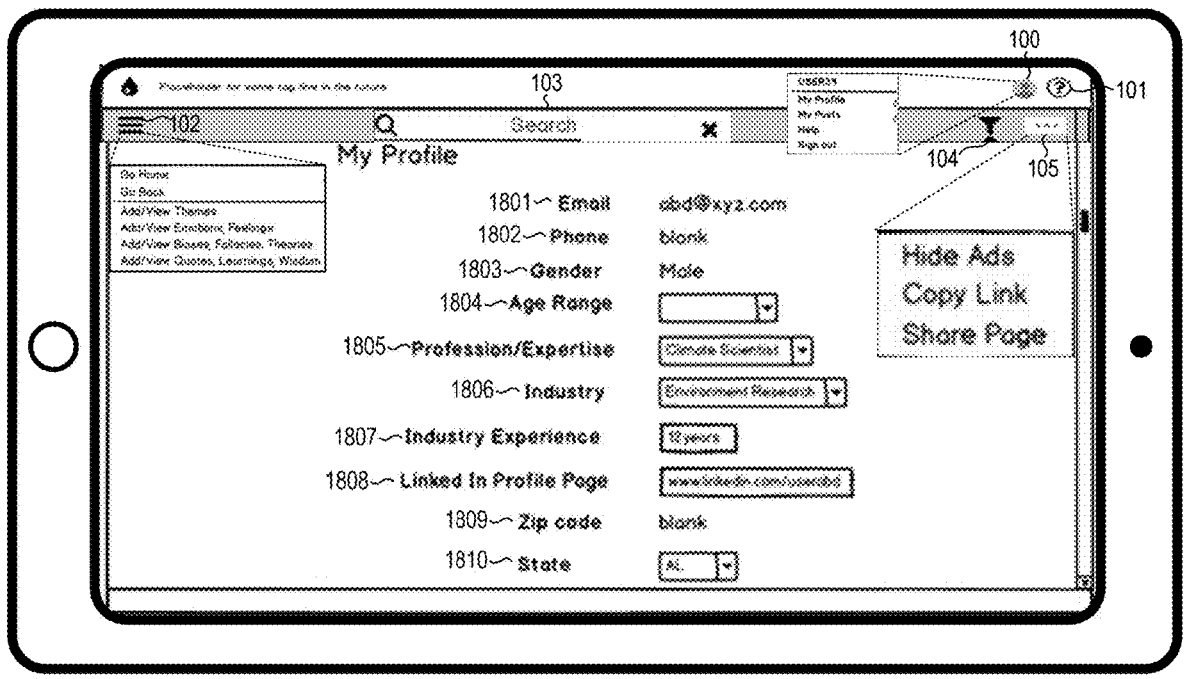
FIG. 4 shows a profile user interface.

FIG. 4 shows a profile user interface. By clicking the profile icon button 100, a dropdown list appears with: the user's alias ("USER39"), My Profile, My Posts, Help, and Sign Out. After logging in (e.g. using Facebook, Google, Gmail, Twitter, or LinkedIn), the user accesses the profile user interface by clicking on the profile icon 100 in the upper right-hand corner of the toolbar and then selecting the "My Profile" option in the dropdown. In addition to the profile icon, there is a help icon 101, a menu icon 102, a search bar 103, a filter icon 104, and an extra menu icon 105. When the user clicks on the menu icon 102, a dropdown list appears with: Go Home, Go Back, Add/View Themes, Add/View Emotions, Feelings, Add/View Biases, Fallacies, Theories, Add/View Quotes, Learnings, Wisdom. The search icon 103 allows the user to search for keywords and phrases within the interface. The filter icon 104 navigates the user to the filter user interface (see FIG. 5). When the user clicks on the extra menu icon 105, a dropdown list appears with: Hide Ads, Copy Link, Share Page.

The profile user interface allows a user to edit their profile information. This page displays the user's email 1801, phone 1802, gender 1803, age range (editable) 1804, profession/expertise (editable) 1805, industry (editable) 1806, industry experience (editable) 1807, linked in profile page (editable) 1808, zip code (editable) 1809, and state (editable) 1810.

Figure 5:
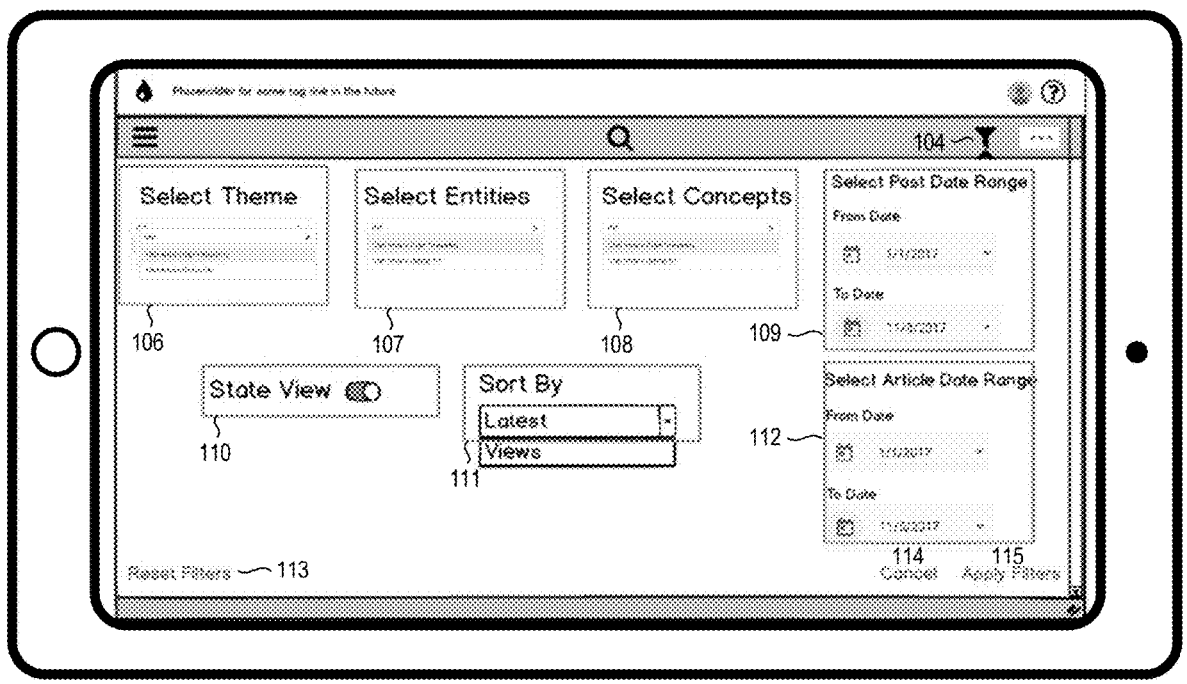
FIG. 5 shows a filter user interface.

FIG. 5 shows a filter user interface. In this interface, there is a select theme filter 106, a select entities filter 107, a select concepts filter 108, a select post date range filter 109, a state view filter 110, a sort by filter 111, a select article date range filter 112. Each of the aforementioned filters (106-112) allow the user to customize the snippets and/or perspective view (see FIGS. 8 and 9) based on their filter selections, which are applied by selecting the apply filters link 115. The filters are not applied if the user selects the cancel link 114. The filters are reset to their default state if the user presses a reset filters link 113.

Figure 6:
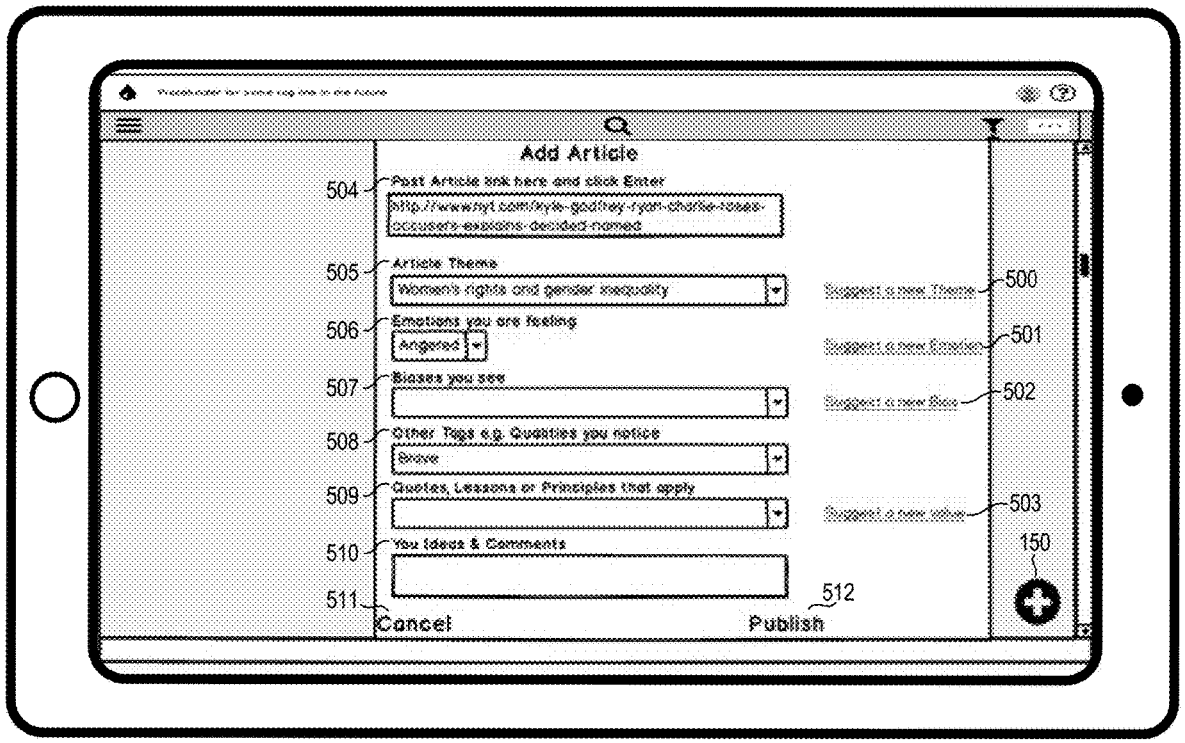
FIG. 6 shows an add article user interface.

FIG. 6 shows an add article interface. The user accesses this interface by selecting the plus icon 150. This interface allows the user to publish a specified article 504 as a content using the publish link 512. In addition, the user can select content attributes including: the user article theme 505, emotion 506, biases 507, tags 508, quotes, lessons, or principles that apply 509, and ideas and comments 510. The links are available for the user to suggest a new theme 500, emotion 501, bias 502, and a new value for quotes, lessons, or principles that apply 503. The user can stop adding an article by using the cancel link 511. In the present example, the user has selected the "New York Times" article 504 (Article 1) with content attributes of: article theme as "Women's rights and gender inequality" 505, emotions as "Angered" 506, and other tags as "Brave" 508. Once created, the article will appear on the snippets view landing page (see FIGS. 8 and 11).

Figure 7:
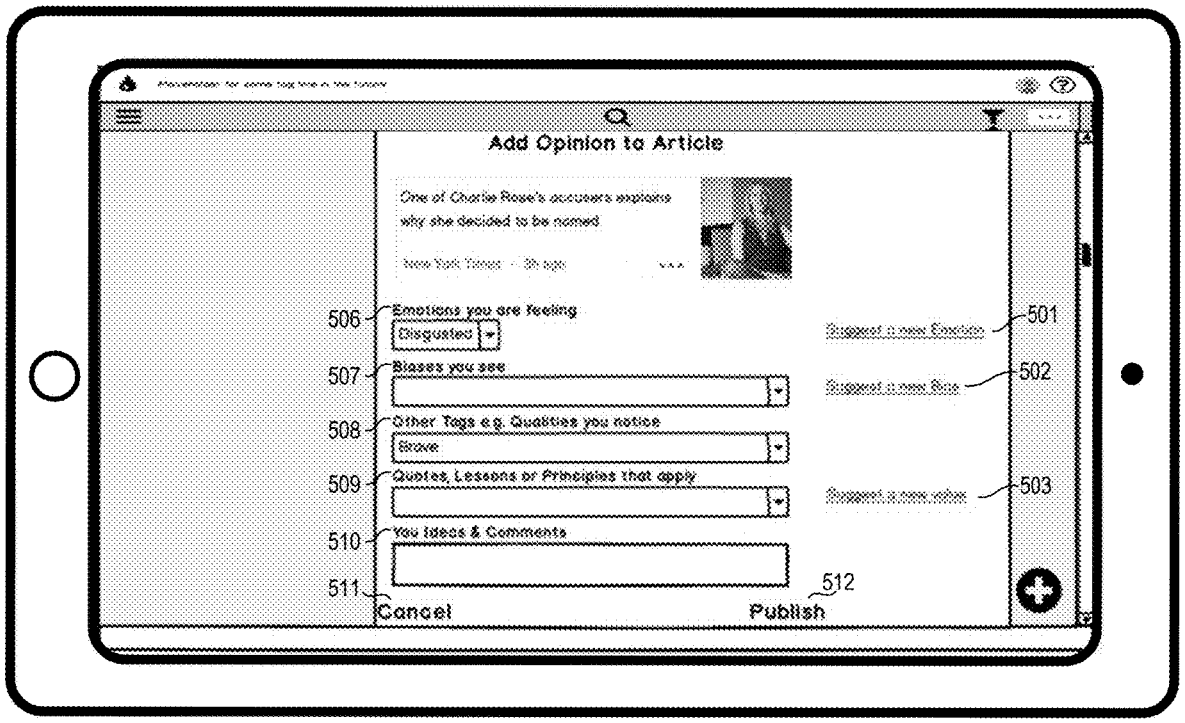
FIG. 7 shows an add opinion to article user interface.

Then, the user can add more attributes related to the article by clicking on the add your opinion button (see FIG. 1) on the created article which will take the user to an Add Opinion to Article interface (see FIG. 7).

FIG. 7 shows an add opinion to article interface. The user accesses this interface by clicking on the add your opinion button 252 (see FIG. 1). This interface allows a user to add content attributes to a particular article including: emotions 506, biases 507, tags 508, quotes, lessons, or principles that apply 509, and ideas and comments 510. The user may also use the links to suggest a new emotion 501, bias 502, and a new value for quotes, lessons, or principles that apply 503. The user publishes this opinion by clicking the publish link 512 and can cancel this process by clicking the cancel link 511. In this example, the user has chosen to add attributes to the New York Times article (Article 1) (e.g. —emotion: disgusted and other tags: brave).

Figure 8:
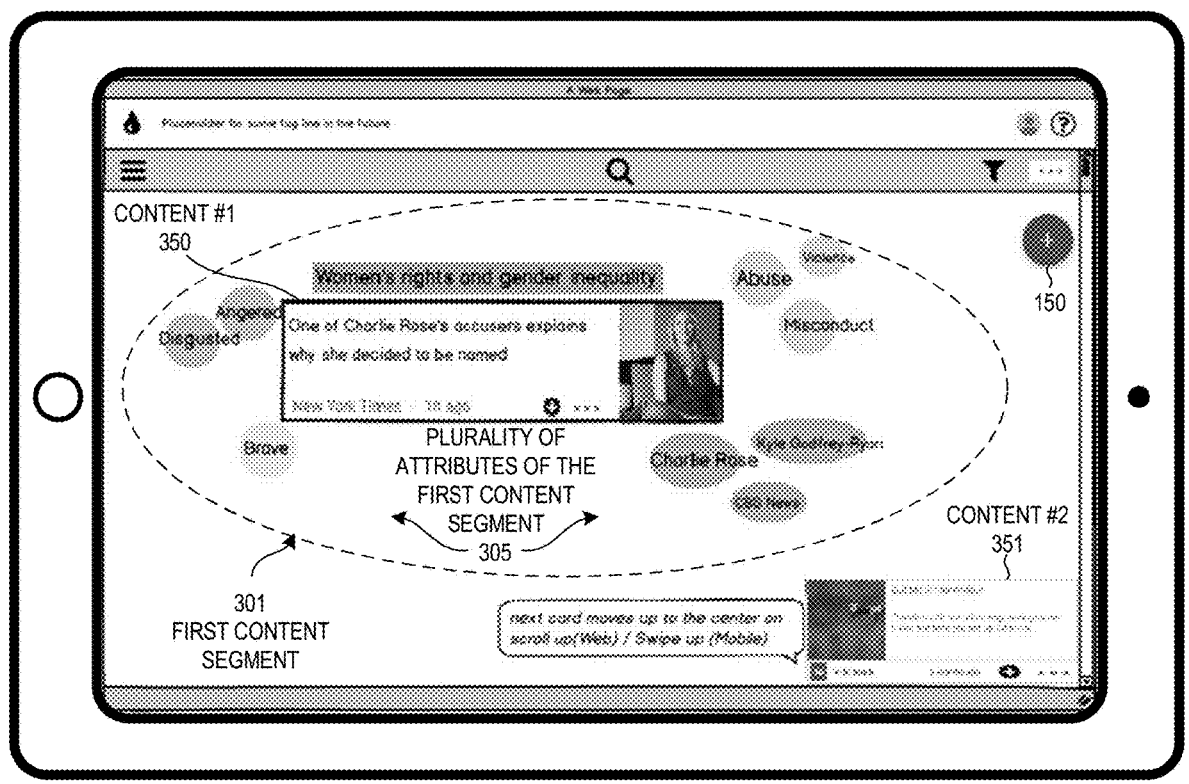
FIG. 8 shows a snippets view user interface (Article 1).

FIG. 8 shows a snippets view user interface (Article 1). The snippets view displays a focused view of a content, a content segment, and a plurality of attributes to the user. If available, the snippets view also displays other contents to the user so that the user can easily navigate to it. In the example shown in FIG. 8, the snippets view shows content that the user has added from the add article and add opinion to article interfaces (FIGS. 6 and 7) including: content #1 (Article 1) 350, a first content segment 301, a plurality of attributes of the first content segment 305, and a content #2 351. This is similar to where FIG. 2 illustrates the content #1 250, the first content segment 301, and the first plurality of attributes of the first content segment 205. The snippets view also displays the add a new article button 150. The system limits the amount of content and attributes that are displayed to the user, thereby focusing the user's attention on important concepts relating to the article. The plurality of attributes will be described in further detail in FIG. 11.

Figure 9:
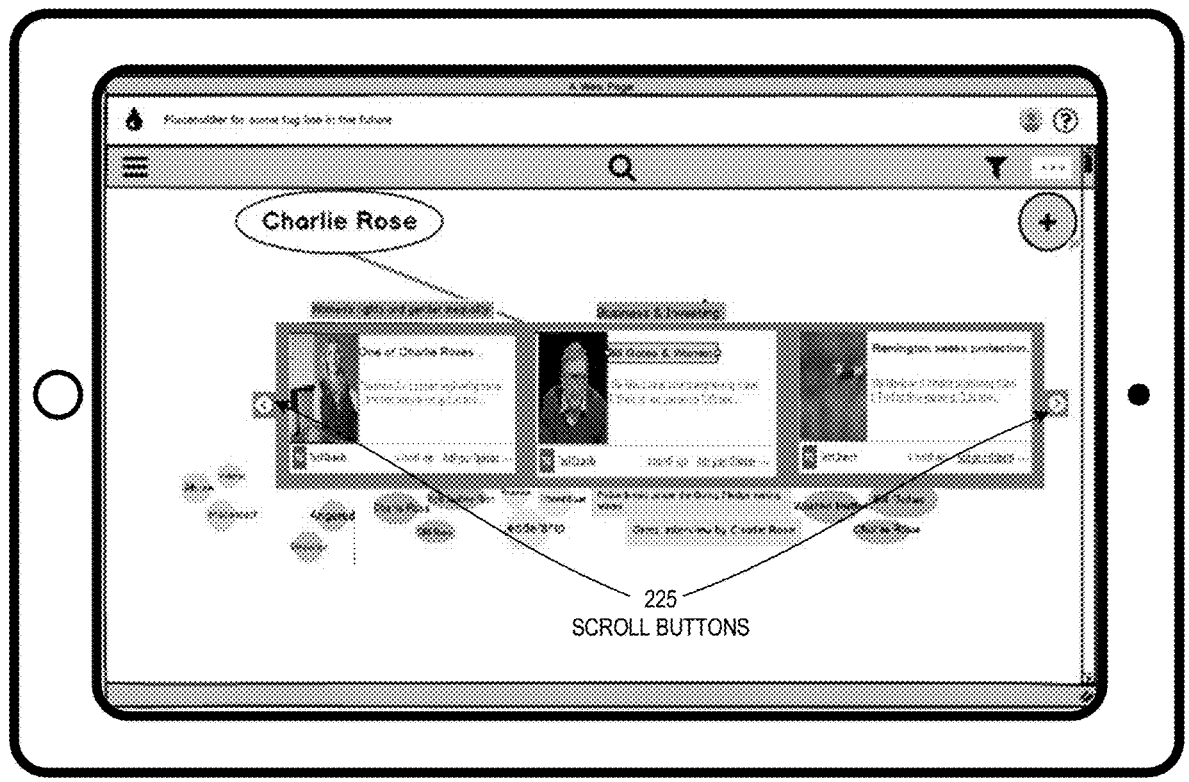
FIG. 9 shows a perspective view user interface.

FIG. 9 shows a perspective view user interface. In this view, the system displays multiple contents (and their content segments and attributes) in a horizontal pattern as to allow the user to quickly scroll between articles. The perspective view allows the user to have a broader view of different contents and their attributes. In this example, there are three contents with their respective content segments and plurality of content attributes. Also, there are two scroll buttons 225 that allow the user to scroll left and right between contents shown on the interface. In another example, the contents are displayed in a vertical or another pattern such that the user can easily maneuver between contents.

Figure 10:
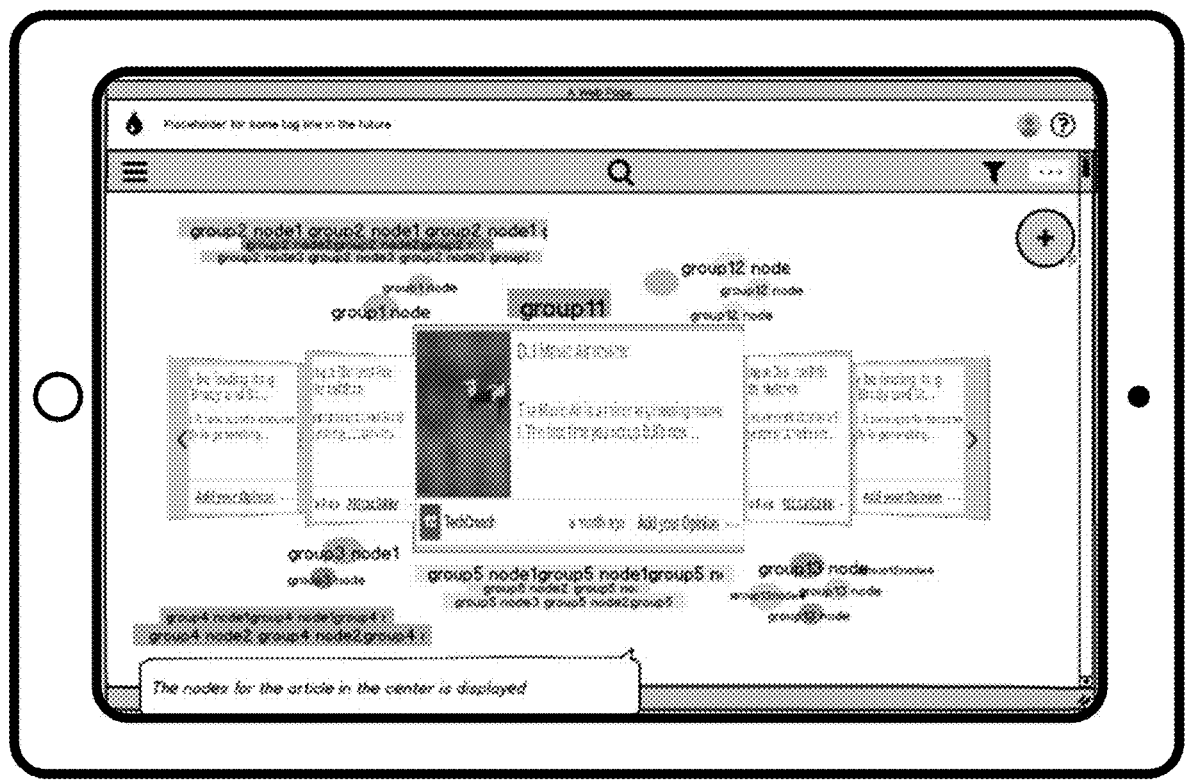
FIG. 10 shows an alternative embodiment for perspective view user interface.

FIG. 10 shows an alternative embodiment for perspective view user interface. In this example, the perspective view user interface is displayed in a different manner for the user. This carousel example provides more attributes and more contents for the user to view at once.

Figure 11:
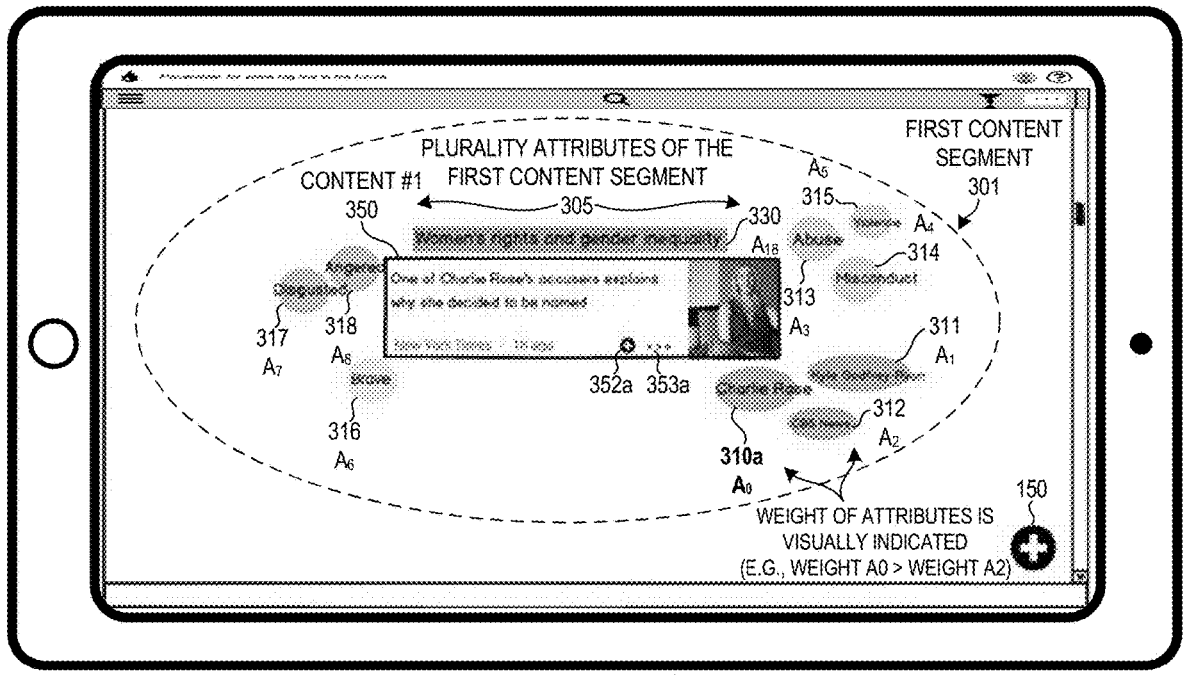
FIG. 11 is a visual display of an example of a first content segment with a plurality of selectable attributes (Article 1).

FIG. 11 is a visual display of an example of a first content segment with a plurality of selectable attributes (Article 1). The interface is updated with information that the user has entered in the add article interface and add opinion to article interface (see FIGS. 6 and 7) (e.g. —article link 504, article theme 505, emotions 506, other tags 508). In this example, similar to FIG. 8, the user has added the first content segment 301, the content #1 (Article 1) 350 which has the plurality of attributes of the first content segment 305. The plurality of attributes of the first content segment 305 has nine attributes: $A_0$ (Charlie Rose) 310a, $A_1$ (Kyle Godfrey-Ryan) 311, $A_2$ (CBS News) 312, $A_3$ (Abuse) 313, $A_4$ (Misconduct) 314, $A_5$ (Violence) 315, $A_6$ (Brave) 316, $A_7$ (Disgusted) 317, and $A_8$ (Angered) 318.

Of these attributes, the user added attributes include: $A_6$ (Brave) 316, $A_7$ (Disgusted) 317, $A_8$ (Angered) 318, and $A_{18}$ (Women's rights and gender equality) 330, which appear to the left of the content #1 350. The attributes that are extracted by the system include: $A_0$ (Charlie Rose) 310a, $A_1$ (Kyle Godfrey-Ryan) 311, $A_2$ (CBS News) 312, $A_3$ (Abuse) 313, $A_4$ (Misconduct) 314, $A_5$ (Violence) 315, and $A_{18}$ (Women's rights and gender equality) 330. The system generated attributes appear to the right and above the content #1 350. In addition, the weight of content attribute $A_0$ (Charlie Rose) 310a as greater than the weight of content attribute $A_2$ (CBS News) 312 as indicated by the size of the shape. Also, this interface has an add a new article button 150 which will navigate the user to the add article interface. In addition, here, the first amount of content 350 has an add opinion article 352a and an expand button 353a.

Figure 12:
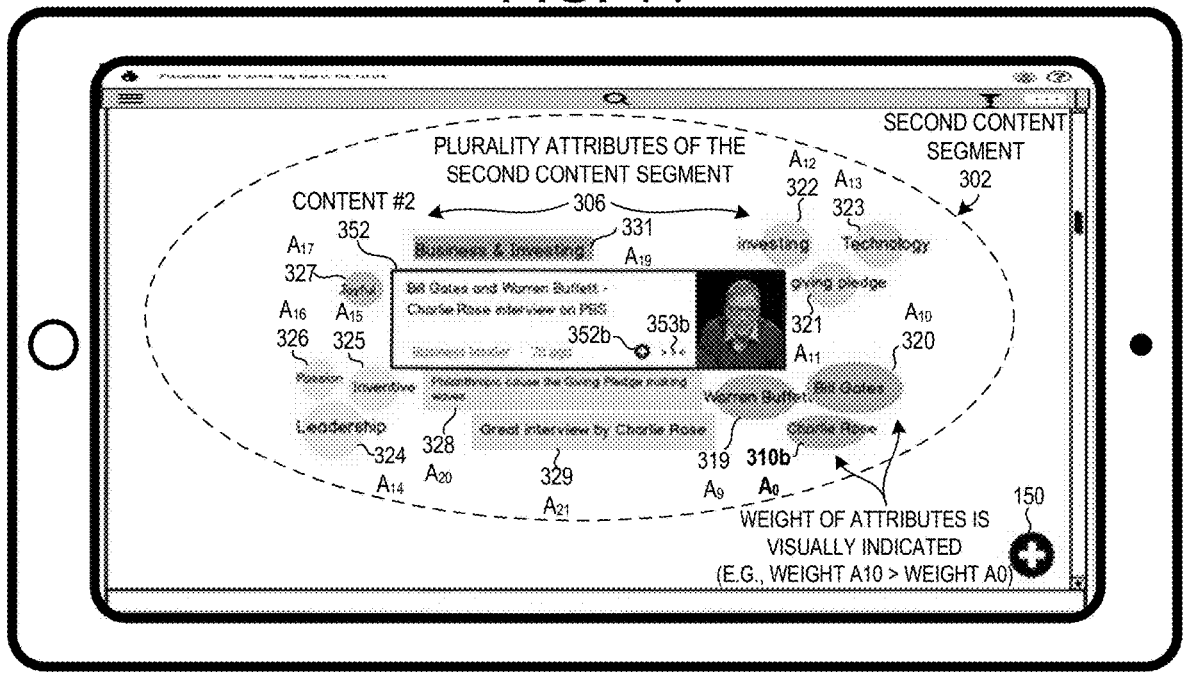
FIG. 12 is a visual display of an example of a second content segment with a plurality of selectable attributes (Article 7).

FIG. 12 is a visual display of an example of a second content segment with a plurality of selectable attributes (Article 7). The interface is updated with information that the user has entered in the add article interface and add opinion to article interface (see FIGS. 6 and 7) (e.g. —article link 504, article theme 505, emotions 506, other tags 508). In this example, a first content segment 301 has a content segment #2 (Article 7) 351 having a plurality of attributes of the second content segment 306. The plurality of attributes of the second content segment 302 has ten attributes: $A_0$ (Charlie Rose) 310b, $A_9$ (Warren Buffet) 319, $A_{10}$ (Bill Gates) 320, $A_{11}$ (Giving Pledge) 321, $A_{12}$ (Investing) 322, $A_{13}$ (Technology) 323, $A_{14}$ (Leadership) 324, $A_{15}$ (Inventive) 325, $A_{16}$ (Passion) 326, $A_{17}$ (Joyful) 327, $A_{20}$ (philanthropic cause the giving pledge making waves) 328, $A_{21}$ (Great interview by Charlie Rose) 329, and $A_{19}$ (Business and Investing) 331.

Of these attributes, the user added attributes include: $A_{14}$ (Leadership) 324, $A_{15}$ (Inventive) 325, $A_{16}$ (Passion) 326, and $A_{17}$ (Joyful) 327, which appear to the left of the content #2 351. The attributes that are extracted by the system include: $A_0$ (Charlie Rose) 310b, $A_9$ (Warren Buffet) 319, $A_{10}$ (Bill Gates) 320, $A_{11}$ (Giving Pledge) 321, $A_{12}$ (Investing) 322, $A_{13}$ (Technology) 323, $A_{20}$ (philanthropic cause the giving pledge making waves) 328, $A_{21}$ (Great interview by Charlie Rose) 329, and $A_{19}$ (Business and Investing) 331. The system generated attributes appear to the right and above the content #1 350. Additionally, in this example, the weight of content attribute $A_{10}$ (Bill Gates) 320 is greater than the weight of content attribute $A_0$ (Charlie Rose) 310b as indicated by the size of the shape. Also, this interface has an add a new article button 150 which will navigate the user to the add article interface. In addition, here, the second amount of content 351 has an add opinion article 352b and an expand button 353b.

FIG. 13 is a visual display of pop-up windows (Article 1). In this example, similar to FIGS. 8 and 11, the interface is updated with information that the user has entered in the add article interface and add opinion to article interface (see FIGS. 6 and 7) (e.g. —article link 504, article theme 505, emotions 506, other tags 508). The user clicks once on a user generated attribute, in this case attribute $A_7$ (Disgusted) 317, which will cause the system to appear the agree/disagree window 254. The user can then select agree or disagree within the window which will show the number of other users who have also selected agree or disagree with the particular attribute. The more users select the agree option, the weight of the attribute will increase. The more users select the disagree option, the weight of the attribute will decrease. In another example, the user can click on another attribute which will cause the agree/disagree window 254 to appear for that selected attribute.

In addition, the user can click on a system generated attribute, in this case attribute $A_0$ (Charlie Rose) 310c, which will cause the system to appear the positive/negative window 255. The user can then select positive or negative within the window which will show the number of other uses who have selected positive or negative with the particular attribute.

The agree/disagree window will only appear for user generated attributes and not system generated attributes. The weight of the system generated attributes is derived from the system. In this example, if the user clicked once on the system generated attribute $A_0$ (Charlie Rose) 310c, this will cause the system to appear the positive/negative window 255 (see FIG. 8).

Figure 14:
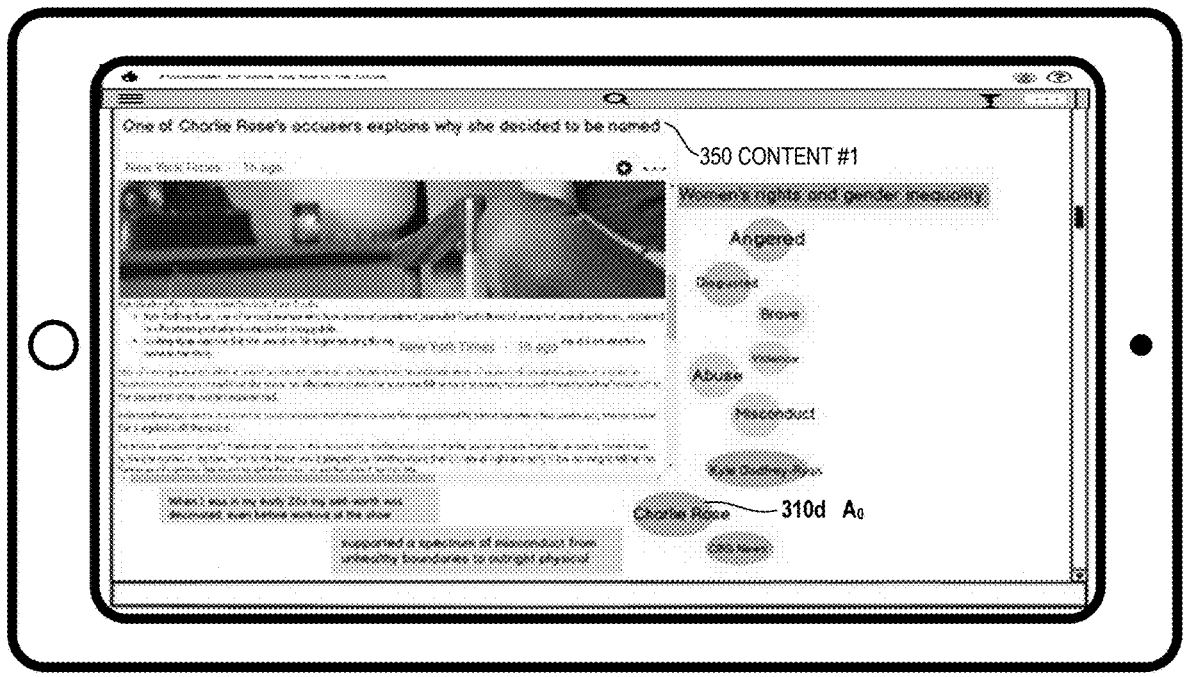
FIG. 14 is a visual display of the article view (Article 1).

FIG. 14 is a visual display of the article view (Article 1). The article view shows more content attributes than the snippets view (see FIG. 8). This allows the user to have a more in-depth view on various attributes relating to the article. A user clicks on the amount of text in the amount of content. In response, the system expands the window, showing more of the article's content. Also, the article view allows a user to scroll through additional information appearing in the article. The system automatically shows more content attributes and arranges the content attributes around the expanded article.

In this example, after the user clicks on the text of content #1 350 ("One of Charlie Rose's accusers explains why she decided to be named") (see FIG. 8 for snippets view), the system expands the content window and arranges the content attributes around the article (e.g. —$A_0$ "Charlie Rose" 310d). In contrast to snippets view, in the article view, the system displays more content attributes around the article.

Figure 15:
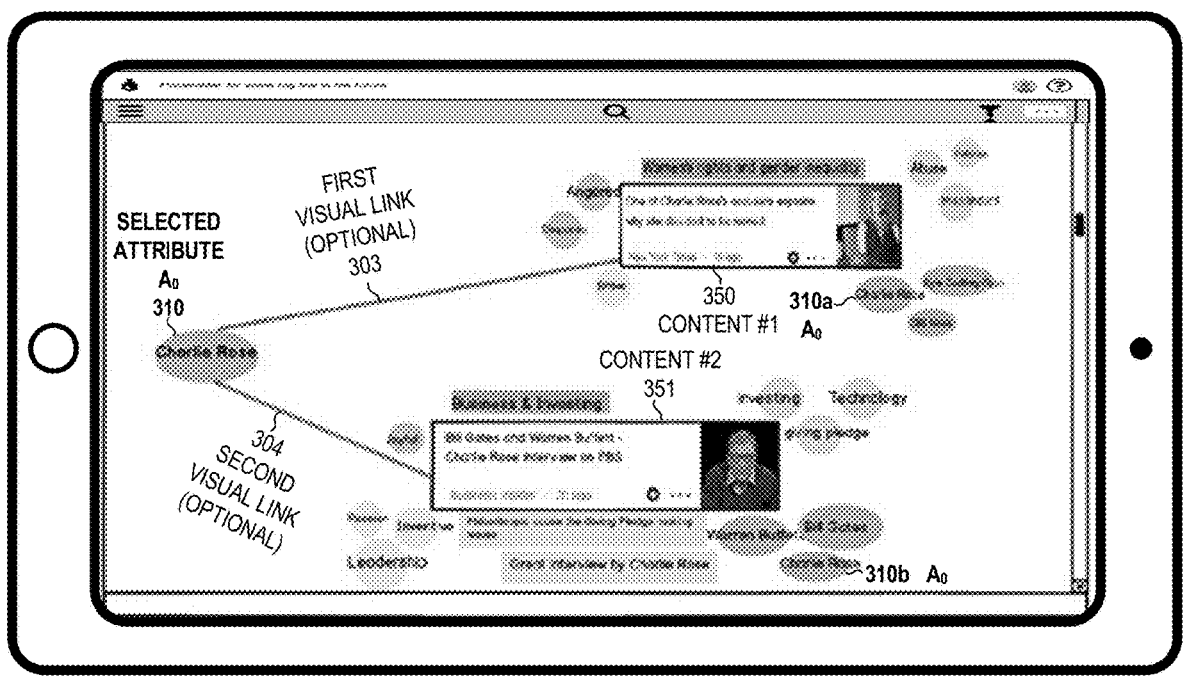
FIG. 15 is a visual display showing a user selected common attribute visually and dynamically linking a first content segment to a second content segment.

FIG. 15 is a visual display showing a user selected attribute visually and dynamically linking a first content segment to a second content segment. This view illustrates another type of perspective view. In this example, there are two content segments, the first content segment (Article 1) 350 and the second content segment (Article 7) 351. Additionally, here the user double-clicked on the selected attribute $A_0$ (Charlie Rose) 310a (or alternatively 310b). In response to the user's selection, the system visually and dynamically links the selected attribute $A_0$ (Charlie Rose) 310 to content segment #1 350 via a first visual link (optional) 303 and linked to content segment #2 351 via a second visual link (optional) 304 (see FIG. 1). In another example, if another content had the same selected attribute $A_0$ (Charlie Rose) 310c (not shown), the system will visually and dynamically link a selected attribute $A_0$ (Charlie Rose) 310 to a plurality of contents containing the same selected attribute $A_0$ (Charlie Rose) 310(a,b,c). This gives users a broader perspective of ideas and a moderation of views, rather than focusing merely on any one aspect of the entity or concept. Specifically, in this example, there is more to Charlie Rose than just the accusation of sexual harassment. The system provides other ideas and views, which users can access easily in a single centralized location. Thus, even if the reader was aware that there is more to Charlie Rose, they may tend to remember the most recent events and attribute that to him disproportionately due to the recency effect bias. The recency effect, also known as primary effect or serial position effect, occurs when items near the end of a sequence are the easiest to recall, followed by the items at the beginning of a sequence; items in the middle are the least likely to be remembered. The VNAS system helps reduce such biases by presenting multiple viewpoints/articles on Charlie Rose in the Perspective view.

In yet another example, when selected by the user, the system will visually and dynamically link a different selected attribute (user or system generated) to other contents having the same selected attribute.

Figure 16:
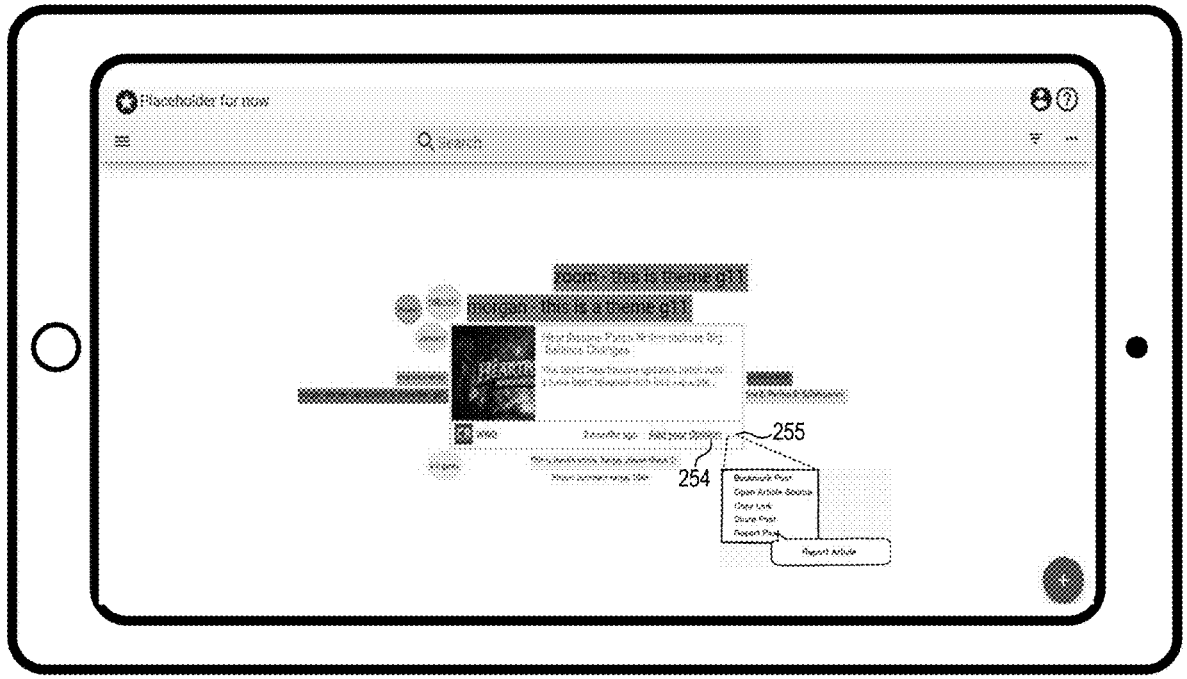
FIG. 16 shows a snippets view user interface with another article.

FIG. 16 shows a snippets view user interface with another article. This user interface is similar to the ones shown in FIGS. 1 and 8. However, in this embodiment, the add your opinion button 252 (see FIG. 1) is an "Add your Opinion" link 254. By the user clicking on this link, the system navigates the user to the Add Opinion to Article interface (see FIG. 7).

Additionally, similar to FIG. 8 (see 253a in FIG. 1), this embodiment has an expand button 255 which when clicked on by the user, a dropdown list appears with: Bookmark Post, Open Article Source, Copy Link, Share Post, and Report Post.

Figure 17:
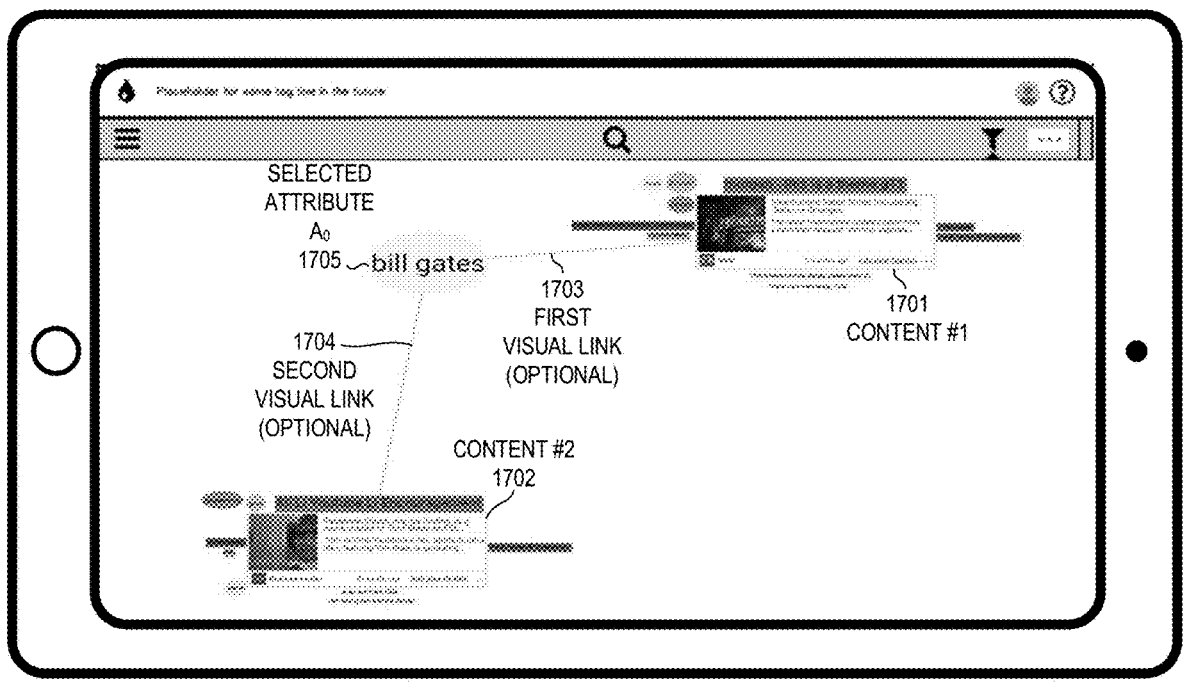
FIG. 17 shows multiple articles linked by a common attribute on user interface.

FIG. 17 shows multiple articles linked by a common attribute on user interface. Similar to FIGS. 1 and 15, in this embodiment, the user double-clicked on the selected attribute $A_0$ (bill gates) 1705. In response to the user's selection, the system visually and dynamically links the selected attribute $A_0$ (bill gates) 1705 to content segment #1 1701 via a first visual link (optional) 1703 and linked to content segment #2 1702 via a second visual link (optional) 1704 (see FIG. 1). In another example, the system will visually and dynamically link a selected attribute $A_0$ (bill gates) 1705 to a plurality of contents containing the same selected attribute $A_0$ (bill gates) 1705. In another example, when selected by the user, the system will visually and dynamically link a different selected attribute to other contents having the same selected attribute.

Figure 18:
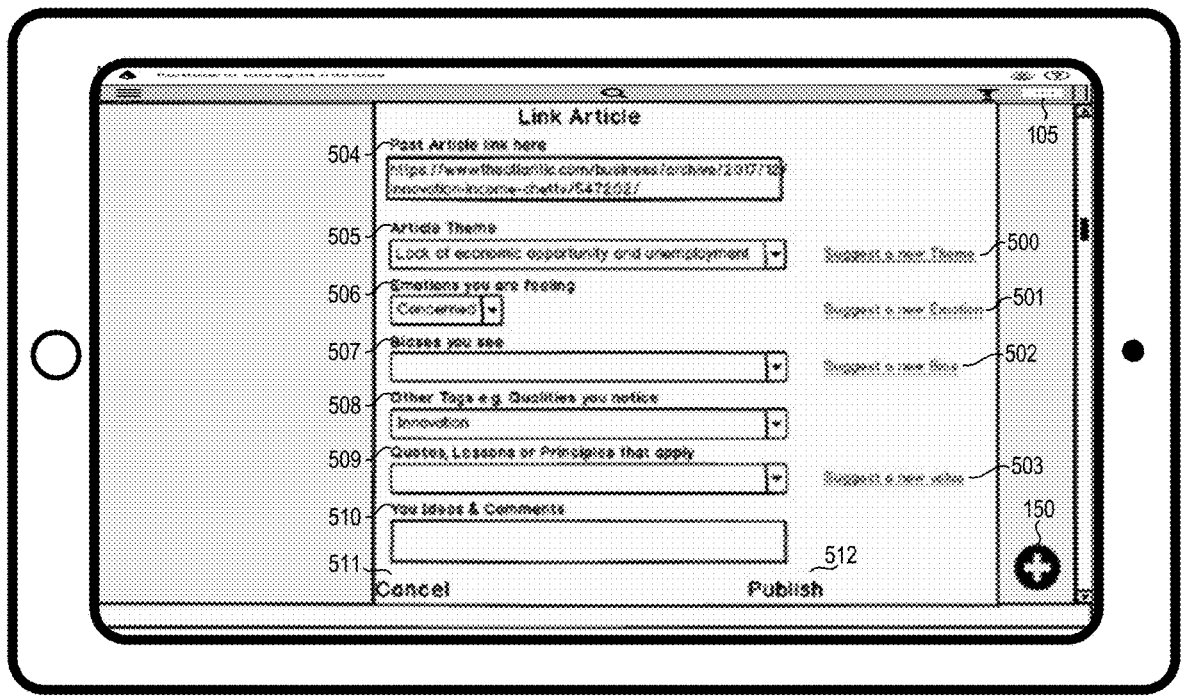
FIG. 18 shows an example of link article interface.

FIG. 18 shows an example of link article interface. The user accesses this interface by selecting the expand menu button 105 (see FIG. 4) and then selecting the link article option. This interface allows a user to link multiple articles together by linking a chosen article 504 to the previously selected article. In addition, similar to the add article interface (see FIG. 6), the user can select content attributes including: theme 504, emotion 506, biases 507, tags 508, quotes, lessons or principles that apply 509, and ideas and comments 510. The user may also use the links to suggest a new theme 500, emotion 501, bias 502, and a new value for quotes, lessons, or principles that apply 503.

The user publishes this opinion by clicking the publish link 512 and can cancel this process by clicking the cancel link 511. In this example, the user is linking an article (theatlantic.com) to a previous article with content attributes of: article theme as "Lack of economic opportunity and unemployment", emotions as "Concerned", and other tags as "Innovation". In addition, once published, the user can create additional attributes related to the article using the add an opinion button 252 within the respective amount of content box (see FIG. 1).

Figure 19:
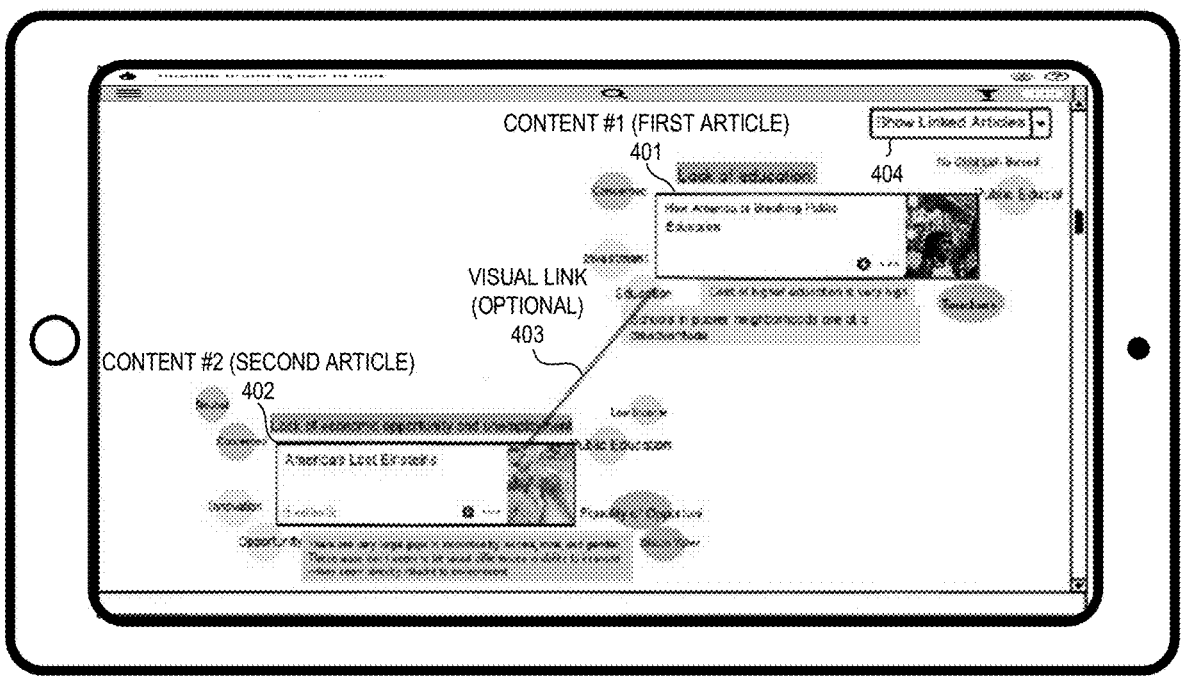
FIG. 19 shows an example of linked articles.

FIG. 19 is an example of linked articles. In this example, there are two articles comprising two separate content segments. A first content segment #1 (First Article) 401 is visually linked (optional) 403 to a second content segment #2 (Second Article) 402. Each of the articles have their respective content attributes. The user directly links the articles using the link article interface (see FIG. 18). In this case, the link is a cause and effect relationship, wherein the first content segment (First Article) 401 breaking public education has a factor in millions of children from poor families who excel in math and science rarely live up to their potential, which hurts everyone, which is the second content segment (Second Article) 402. In another embodiment, the visual link (optional) is based on other factors determined by the system.

Figure 20:
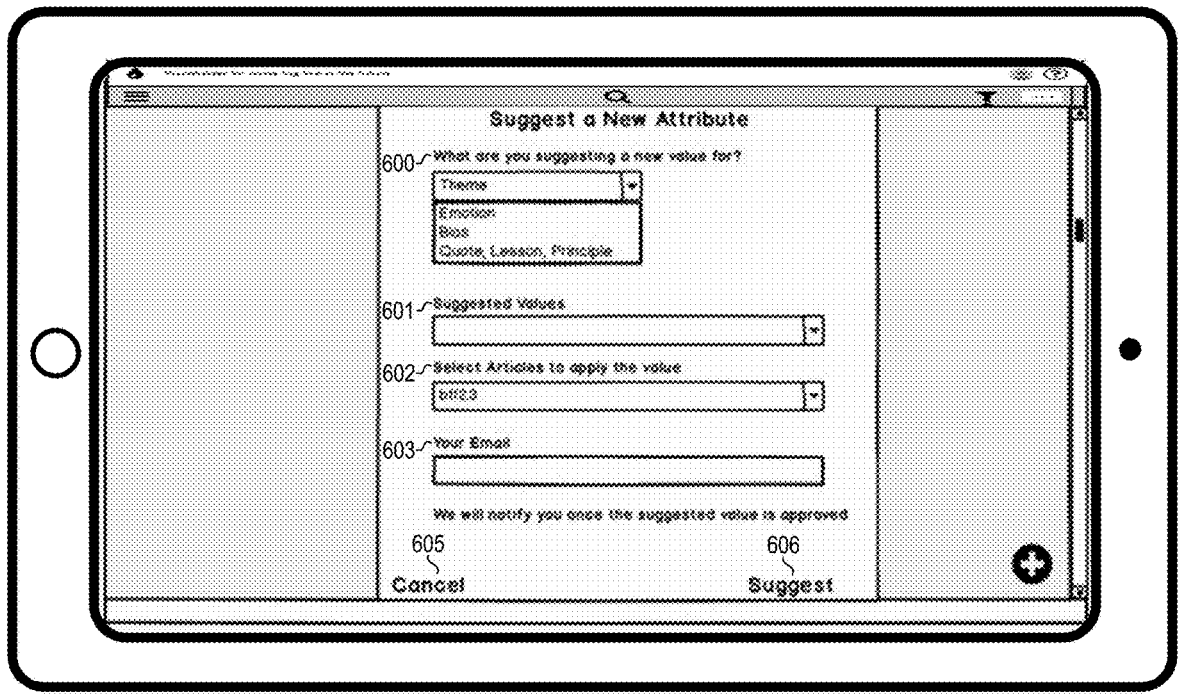
FIG. 20 shows a suggest a new article interface.

FIG. 20 shows a suggest a new attribute interface. This interface allows a user to suggest a new attribute if one does not already exist. The user accesses this interface by clicking on one of the links (500, 501, 502, or 503) on the add article interface (see FIG. 6) or link article interface (see FIG. 18). This interface allows a user to suggest a new attribute which will be saved in the database and once approved, will be made available to users to add to topical matters. The user can add a new theme, emotion, bias, or quote, lesson, or principle 600, suggested values 601, articles to apply the value 602, and the user's e-mail 603. The user suggests this attribute by clicking the suggest link 606 and can cancel this process by clicking the cancel link 605. In this example the user is adding a new theme 600 that will apply to article bff23 602.

Figure 21:
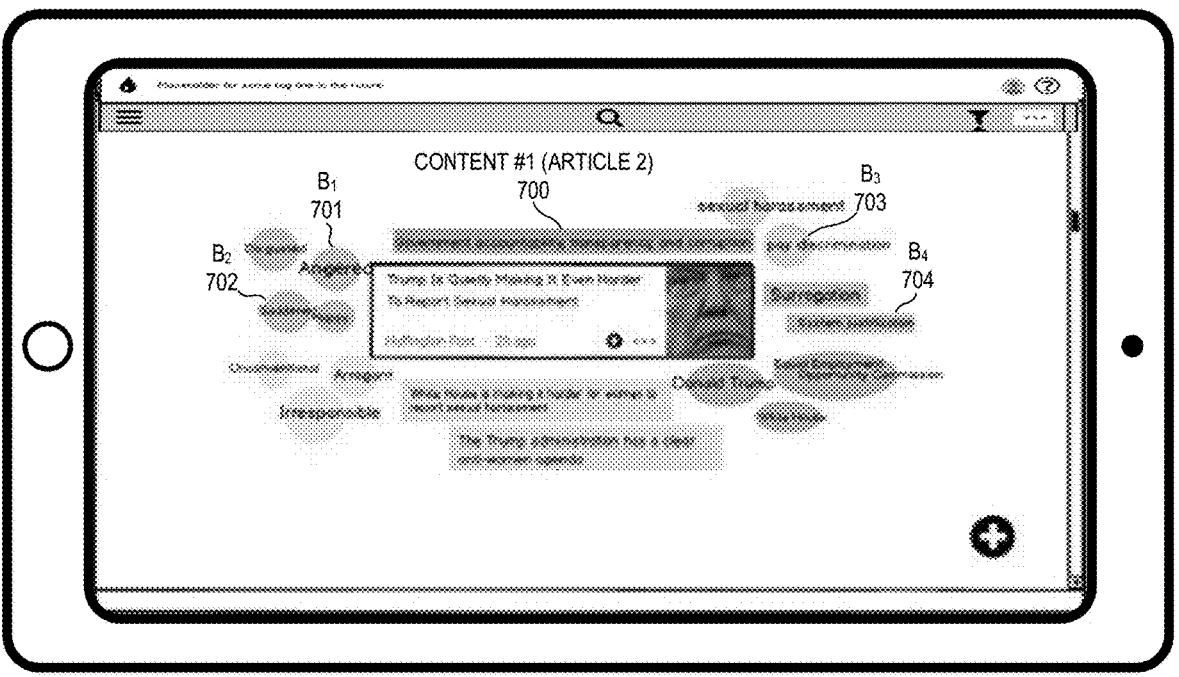
FIG. 21 shows an example of another article (Article 2) with generated attributes.

FIG. 21 shows an example of another article (Article 2) with generated attributes. In this example, a user has created a content segment #1 (Article 2) 500 with system generated attributes similar to the ones shown in FIGS. 4 and 5. The system visually depicts multiple content attributes (e.g. —$B_1$ (Angered) 501, $B_2$ (Saddened) 502, $B_3$ (Pay Discrimination) 503, $B_4$ (System Justification) 504, and others). In addition to the types of attributes shown on FIG. 8, FIG. 10 shows other system generated attributes on the right of the content #1 700, (e.g. —"System Justification") $B_4$ 504. In another example, other attributes are generated by the system and are selectable by the user.

Figure 22:
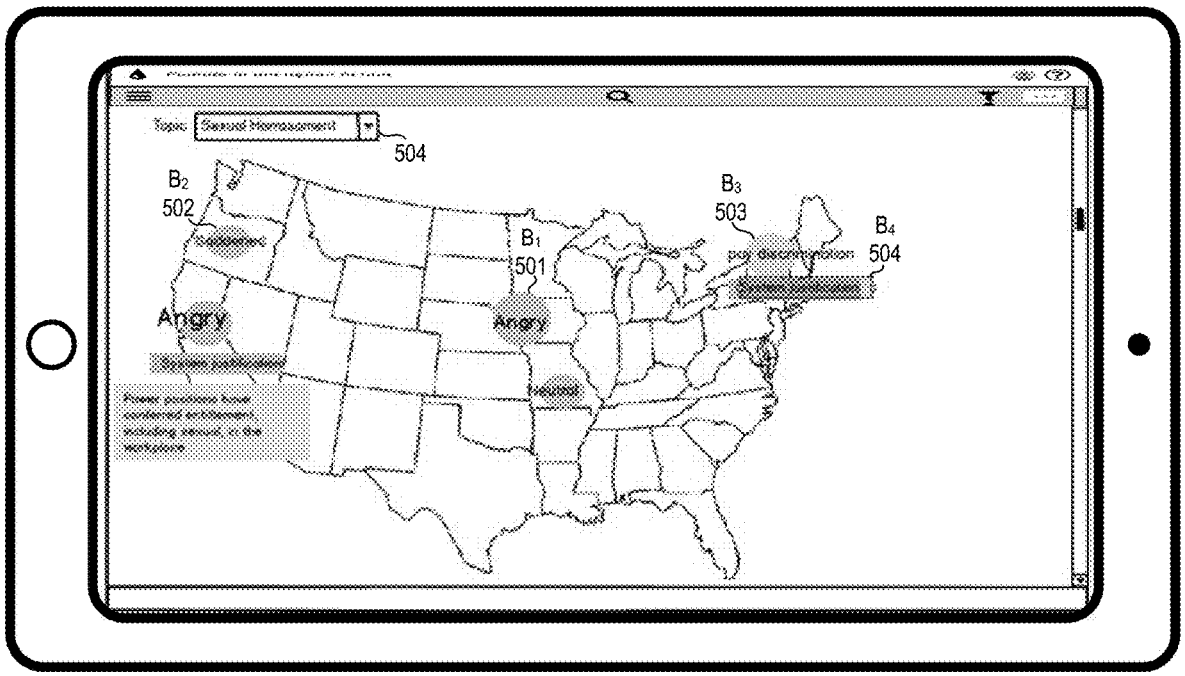
FIG. 22 shows a geographical representation of selectable attributes (Article 2).

FIG. 22 shows a geographical representation of selectable attributes (Article 2). This example shows a geographical map with content attributes of the content segment #1 (Article 2) 500 related to the user selected topic of "Sexual Harassment" 504. The attributes generated by the system to be shown as per their respective location (e.g. $B_2$ saddened 502 in the state of Oregon). In another example, a user selects a different topic 504 and different content attributes are generated and shown. In yet another example, a different geographical representation will display when the user selects a different article having the same or different content attributes.

Figure 23:
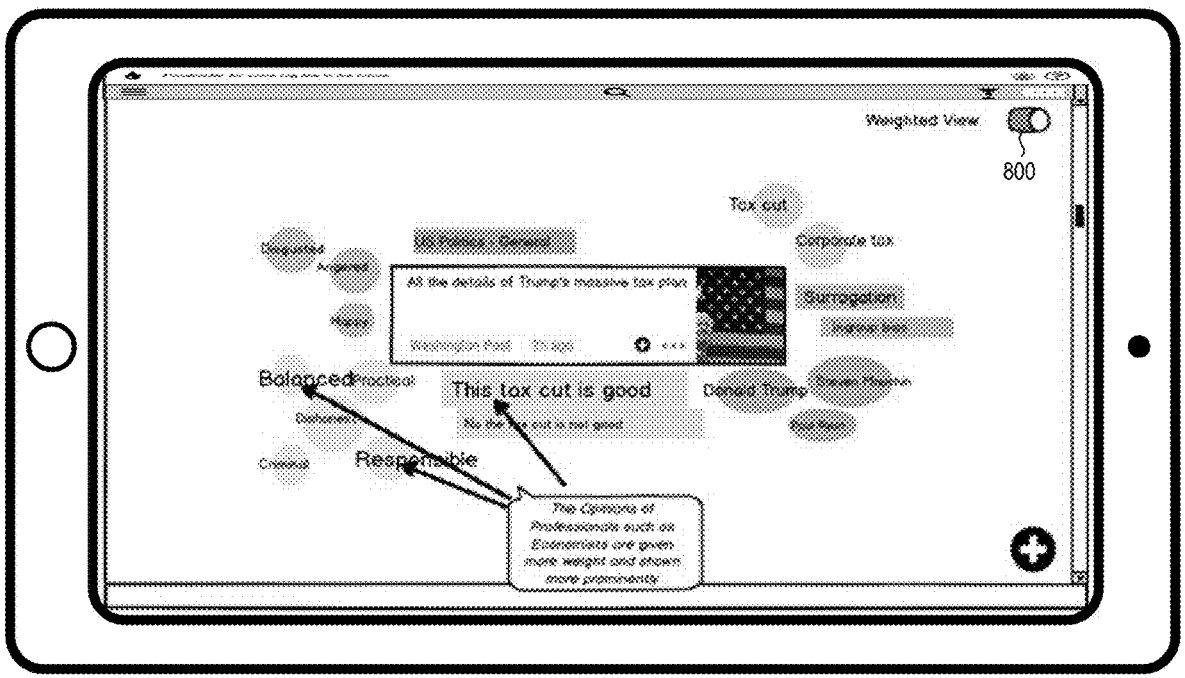
FIG. 23 shows a weighted display of selectable attributes.

FIG. 23 shows a weighted display of selectable attributes. In the present example, the user has selected the weighted view 800 as shown in the top right corner of the figure. The system gives more weight to content attributes of certain individuals based on their profile profession, among other factors (see FIGS. 2 and 4). The system displays attributes with more weight more prominently than those with less weight. The weighted view provides a different perspective on the same issue. Accordingly, the displayed outcome could differ significantly from the non-weighted view. As in the example shown, when weighted towards opinions of Economists only a different conclusion is reached (i.e. "Tax Cut is good" vs. the general conclusion that the "Tax Cut is not good").

Figure 24:
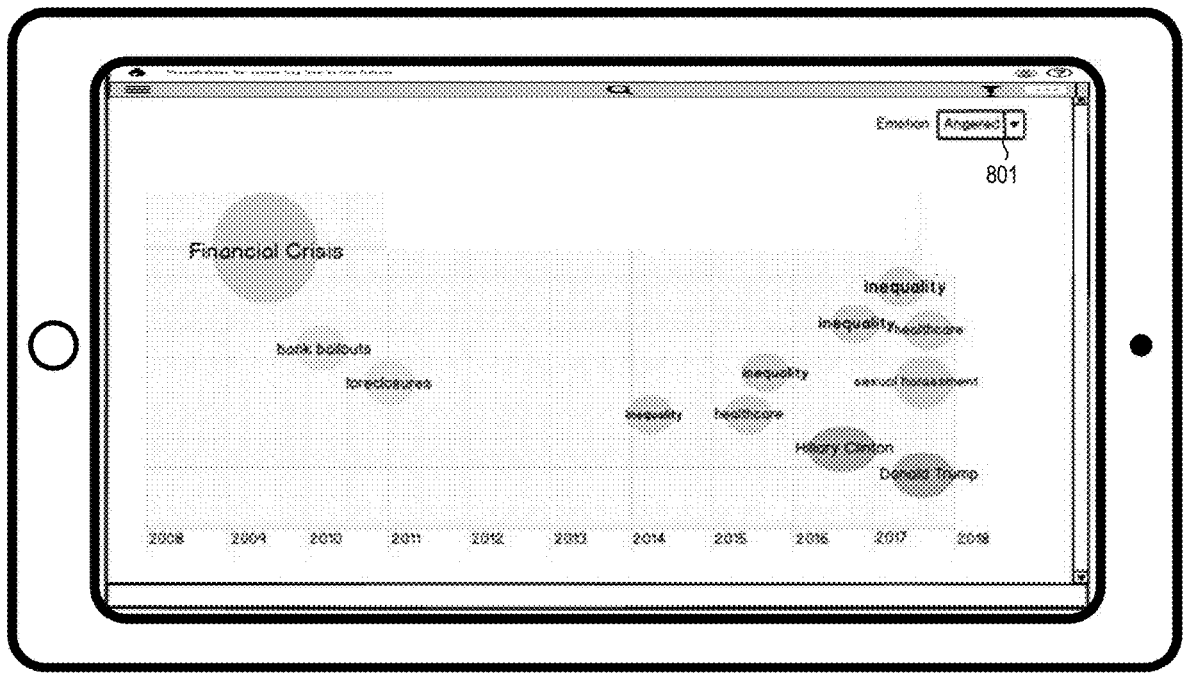
FIG. 24 shows a temporal representation of selectable attributes.

FIG. 24 shows a temporal representation of selectable attributes. This figure illustrates a timeline and trend analysis interface with content attributes represented over a period of time. In this particular example, the user selects a specific content attribute 801 (e.g. Angered) and in response, the system displays a timeline based on that user selected attribute. The system uses opinions, facts, and classification data aggregated on the platform. In another example, the system can extract other insights and also use predictive analysis to identify future trends (e.g. —inequality as an intensifying trend).

Figure 25:
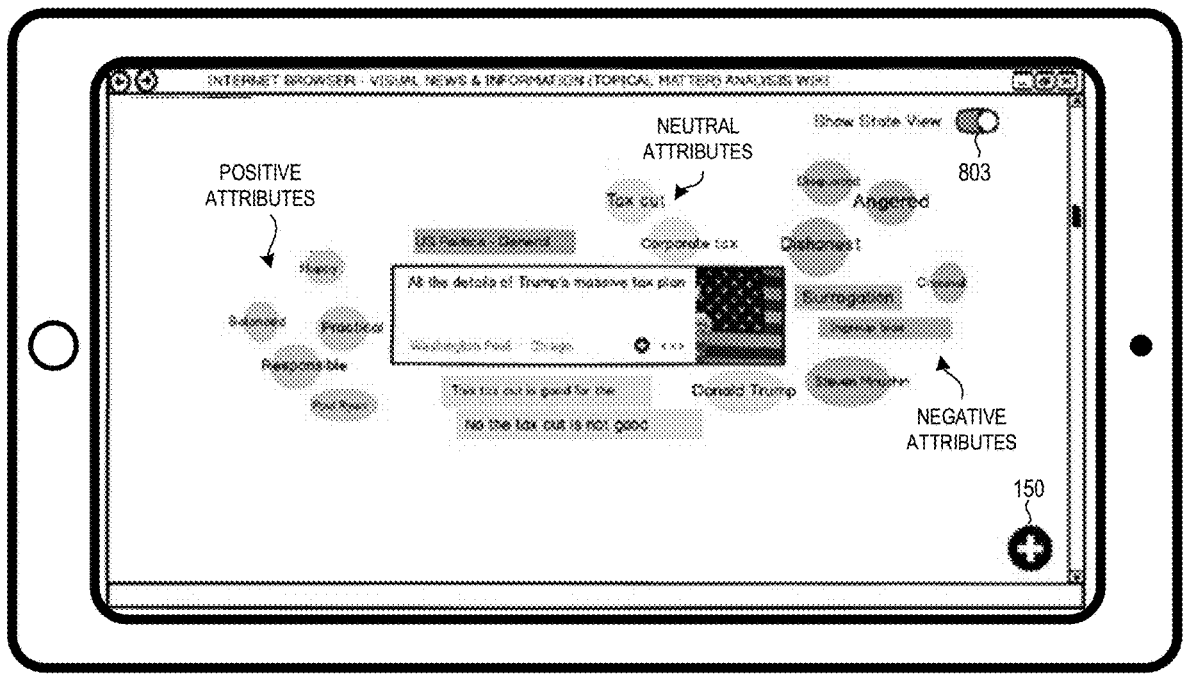
FIG. 25 shows a state view of selectable attributes.

FIG. 25 shows a state view of selectable attributes (Article 6). In this example, when a user enables the "show state view" switch 803, the system responds by categorizing the content attributes of a specific article (e.g. Article 6) by positive, neutral, and negative attributes. The content attributes are visually arranged around the article based on these categorizations.

Figure 26:
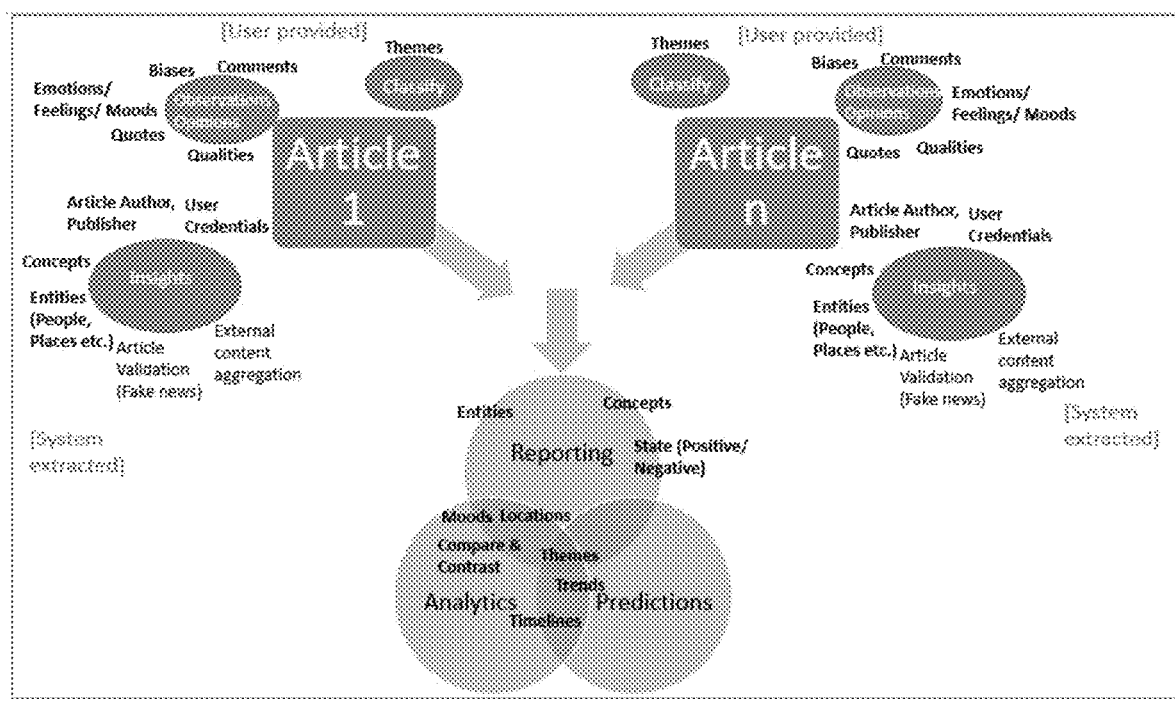
FIG. 26 shows a process of categorizing user created attributes as system generated attributes.

FIG. 26 shows a process of categorizing user created attributes as system generated attributes. Here, there are two articles: article 1 (first article) and article n (another article). Both article 1 (content segment #1) and article n (content segment #n) have different categories of content attributes (e.g. Classify, Observations and Opinions, and Insights). The content attribute categories "classify" and "observations and opinions" are user generated, whereas the "insights" are system extracted. The system generates three categories (Reporting, Analytics, and Predictions) based on the content attributes of both contents.

Figure 27:
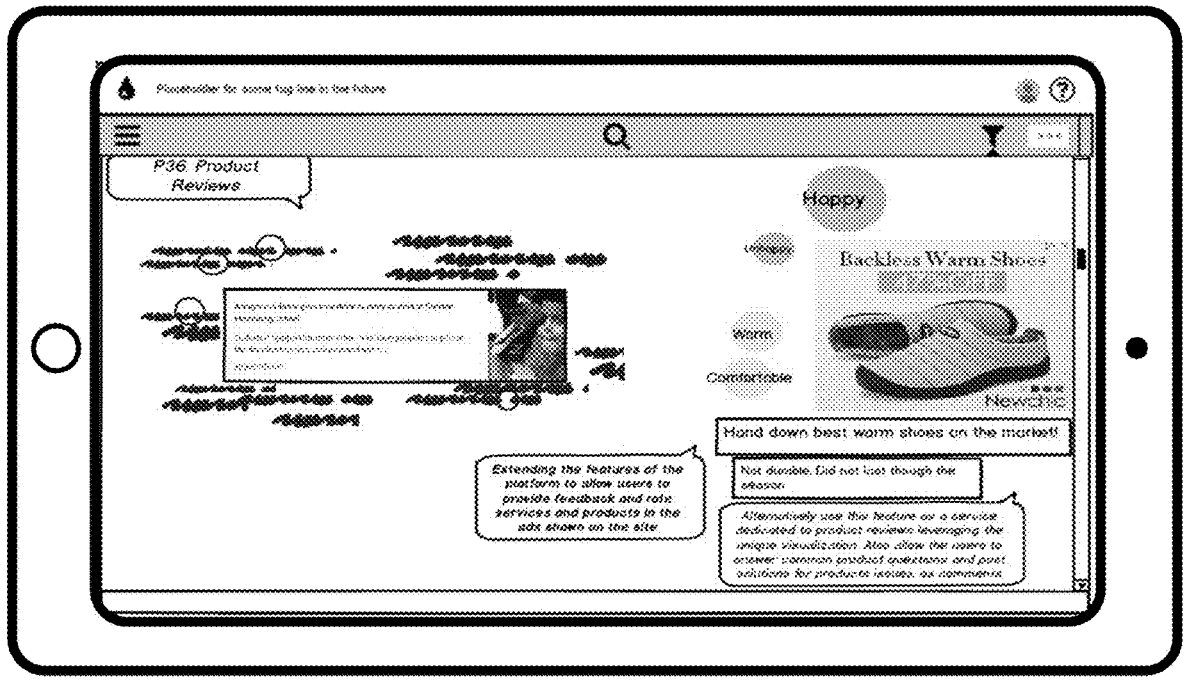
FIG. 27 shows a product reviews user interface.

FIG. 27 shows another embodiment in product reviews. In this embodiment, the system generates content and content attributes in addition to the article shown in the snippets view. In this example, the additional content is an advertisement for Backless Warm Shoes. The user can add content attributes for this content similar to the way that a user can add content attributes for an article content. The attributes are weighted similarly to how a user can agree/disagree with content attributes on the main content (see FIG. 13). This is intended to allow users to provide feedback on the advertisement within the snippets view without having to navigate to the advertisement's external site.

Figure 28:
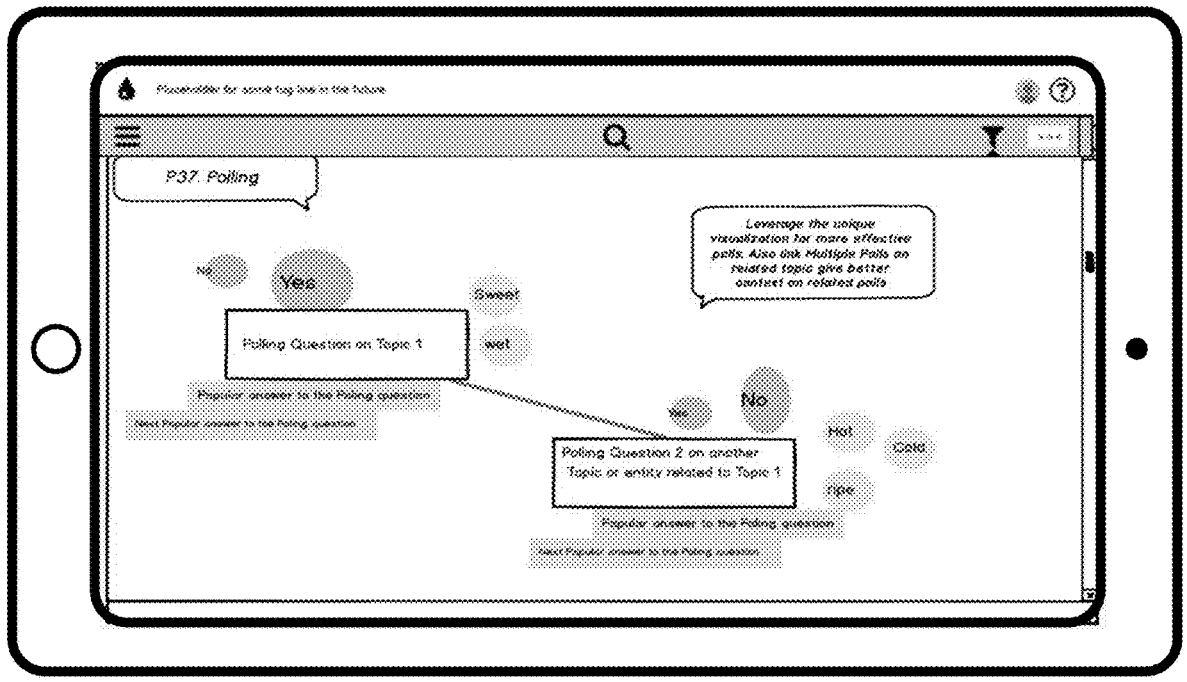
FIG. 28 shows a polling user interface.

FIG. 28 shows another embodiment in polling. In this example, the user generates polling questions which is similar to how a user can add an article to the snippets view (see FIG. 8). The user can add content attributes for this content similar to the way that a user can add content attributes for an article content. The attributes are weighted similarly to how a user can agree/disagree with content attributes on the main content (see FIG. 13). This is intended to leverage the unique visualization to provide for more effective polls.

Figure 29:
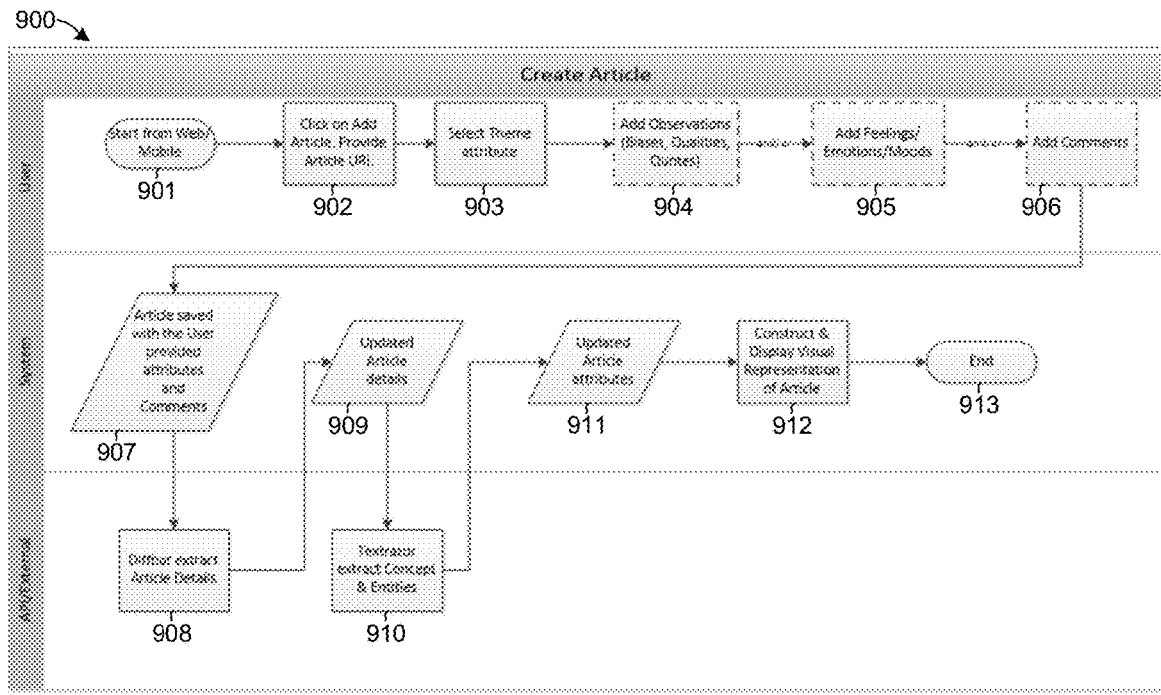
FIG. 29 shows a create article flowchart.

FIG. 29 shows a create article flowchart. The create an article process 900 begins with step 901 with the user starting on a web browser or mobile device. Step 902, the user clicks on add an article button (see 150 in FIG. 6) 150 and provides an external website Universal Resource Locator (URL) (see 504 in FIG. 6). In step 903, the user selects a theme attribute (see 505 in FIG. 6). In step 904, the user adds observations (see 506-509 in FIG. 6). In step 905, the user adds feelings/emotions/moods (see 506 in FIG. 6). In step 906, the user adds comments (see 510 in FIG. 6).

In step 907, after the user has clicked the publish link (see 512 in FIG. 6), the system saves the article with the user provided attributes and comments. Then, in step 908, the API/External diffbot extracts article details. In another embodiment, a different third-party service extracts article information. In step 909, the system updates the article details. In step 910, the API/external textrazor extracts concepts and entities. In another embodiment, a different third-party API/external extractor is used to extract concepts and entities. In step 911, the system updates article attributes. In step 912, the system constructs and displays a visual representation of the article (see attributes on FIGS. 8 and 11). Step 913 ends the create article process.

Figure 30:
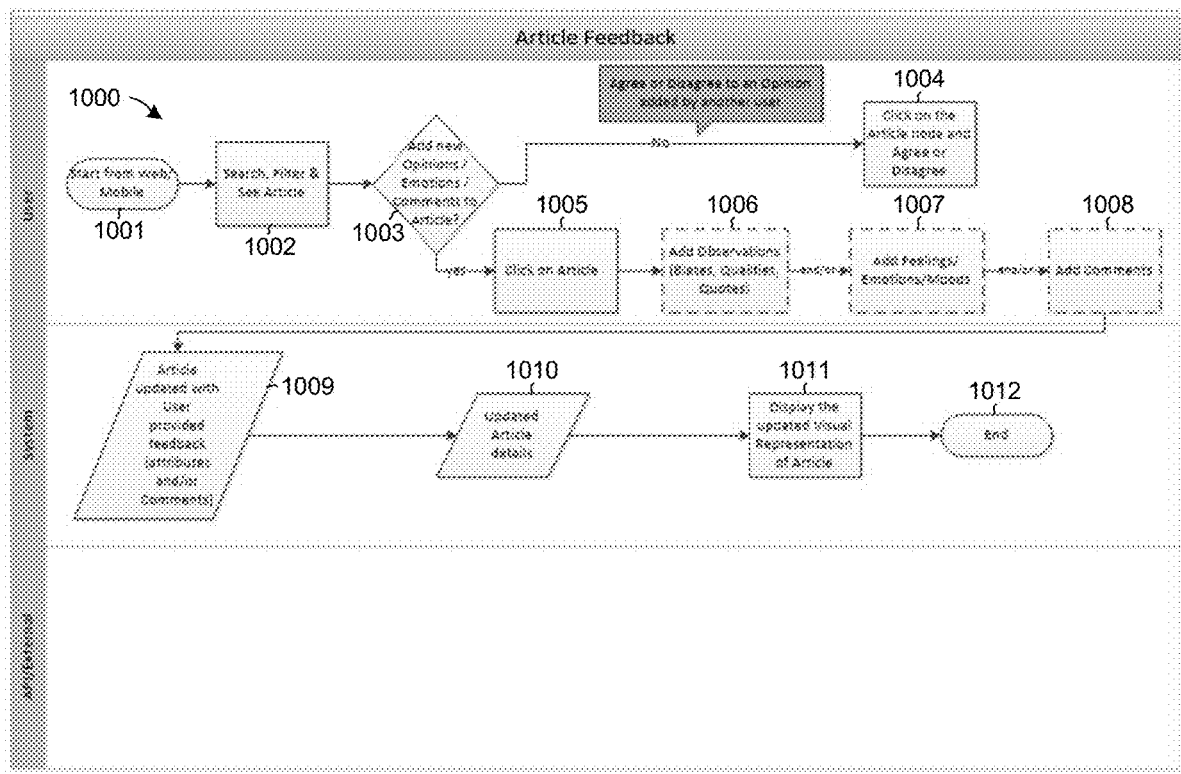
FIG. 30 shows an article feedback flowchart.

FIG. 30 shows an article feedback flowchart. The article feedback process 1000 begins with step 1001 with the user starting on a web browser or mobile device. In step 1002, the user searches, filters, and views the article. In step 1003, the user has the option to add new opinions, emotions, and comments to the article (see FIG. 7). In step 1004, the user can agree or disagree with an opinion added by another user by clicking on the attribute and selecting agree or disagree in the agree/disagree window (see 254 in FIG. 13).

In step 1005, if the user decides to add new opinions, emotions, and comments the user clicks on the add an opinion button (see 252a in FIG. 11). Then, in step 1006, the user adds observations (see 506-509 in FIG. 7). In step 1007, the user adds feelings/emotions/moods (see 506 in FIG. 7). In step 1008, the user adds comments (see 510 in FIG. 7).

In step 1009, the system updates article attributes with user provided feedback. In step 1010, the system updates article attributes. In step 1011, the system constructs and displays a visual representation of the article (see attributes on FIGS. 8 and 11). Step 1012 ends the create article process.

Figure 31:
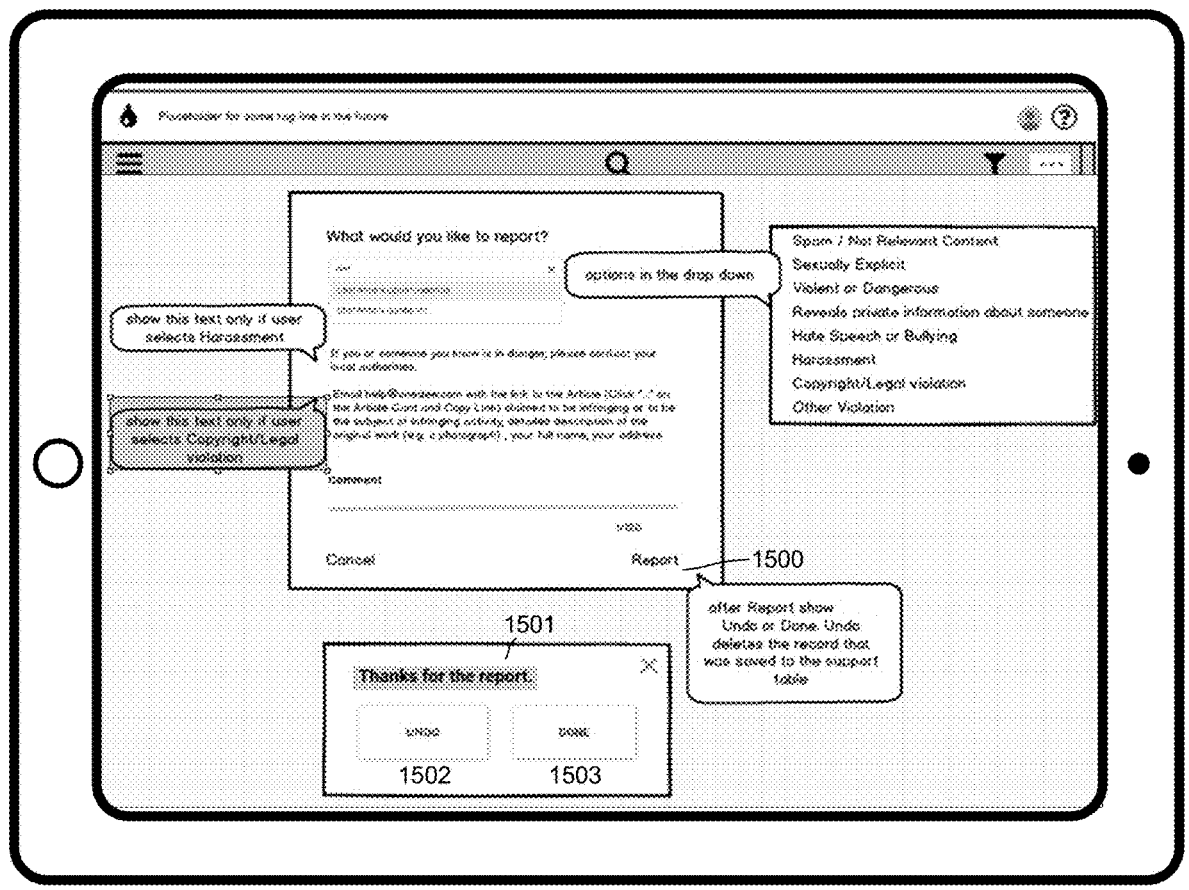
FIG. 31 shows a report article interface.

FIG. 31 shows a report article interface. The user navigates to this interface by selecting the "Report Post" option in the expand button 255 dropdown menu (see FIG. 16). The system displays a dropdown list for users to select from including: "Spam/Not Relevant Content", "Sexually Explicit", "Violent or Dangerous", "Reveals private information about someone", "Hate Speech or Bullying", "Harassment", "Copyright/Legal Violation", and "Other Violation". As shown in FIG. 31, the text "If you or someone you know is in danger, please contact your local authorities" only appears if the user selects the "Harassment" option from the dropdown menu. Also, the text "Email help@onedew.com with the link to the Article (Click on the Article Card and Copy Link) claimed to be infringing or to be the subject of infringing activity, detailed description of the original work (e.g. a photograph), your full name, your address" only appears if the user selects the Copyright/Legal Violation dropdown. Once the user selects the report link 1500, the system displays a window 1501 with two buttons, undo 1502 and done 1503. If the user selects the undo button 1502, the record is deleted from the support table. If the user selects the done button 1503, the system returns the user to the snippets view of that article. This interface is intended to allow a user to help eliminate improper posts by other users.

Figure 32:
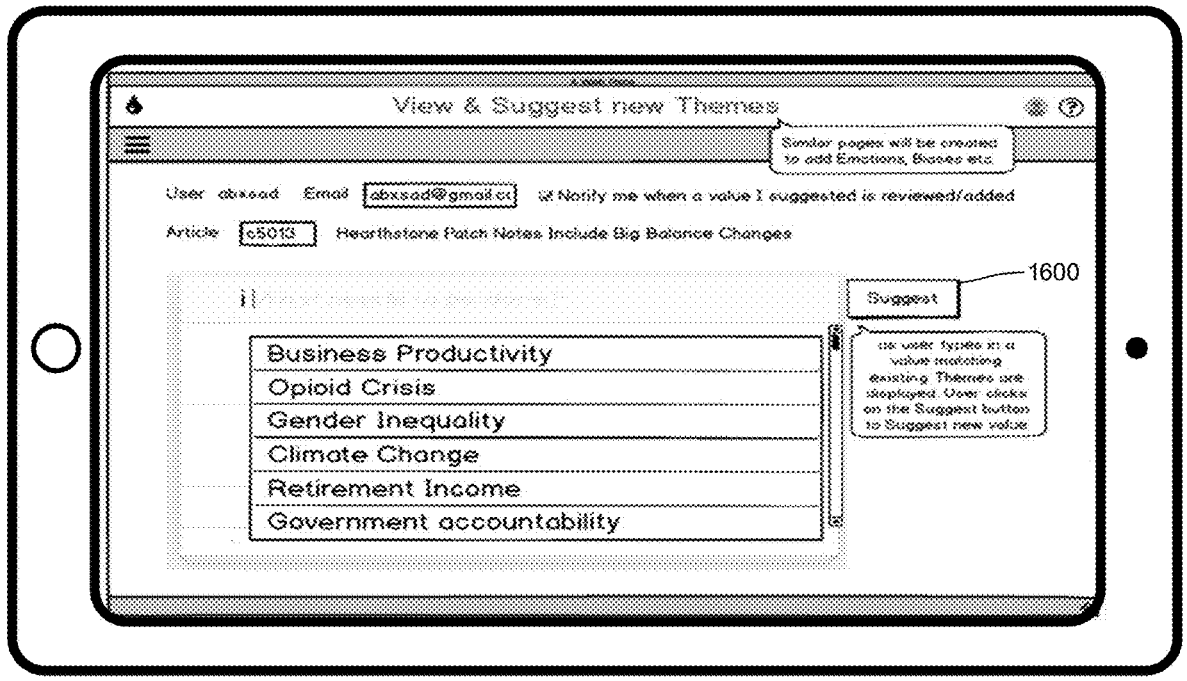
FIG. 32 shows a view and suggest new themes interface.

FIG. 32 shows a view and suggest new themes interface. The user can navigate to this interface by selecting the "Suggest a new Theme" link 500 on the add article interface (see FIG. 6) or link article user interface (see FIG. 18). On this interface, the system displays a list of themes already stored within the system. The user will be able to type in a theme click the suggest button 1600 to suggest a new value. In other examples, the user will be able to navigate to the "Suggest a new Emotion" interface, "Suggest a new Bias" interface, and "Suggest a new value" interface (see FIGS. 6 and 18).

Figure 33:
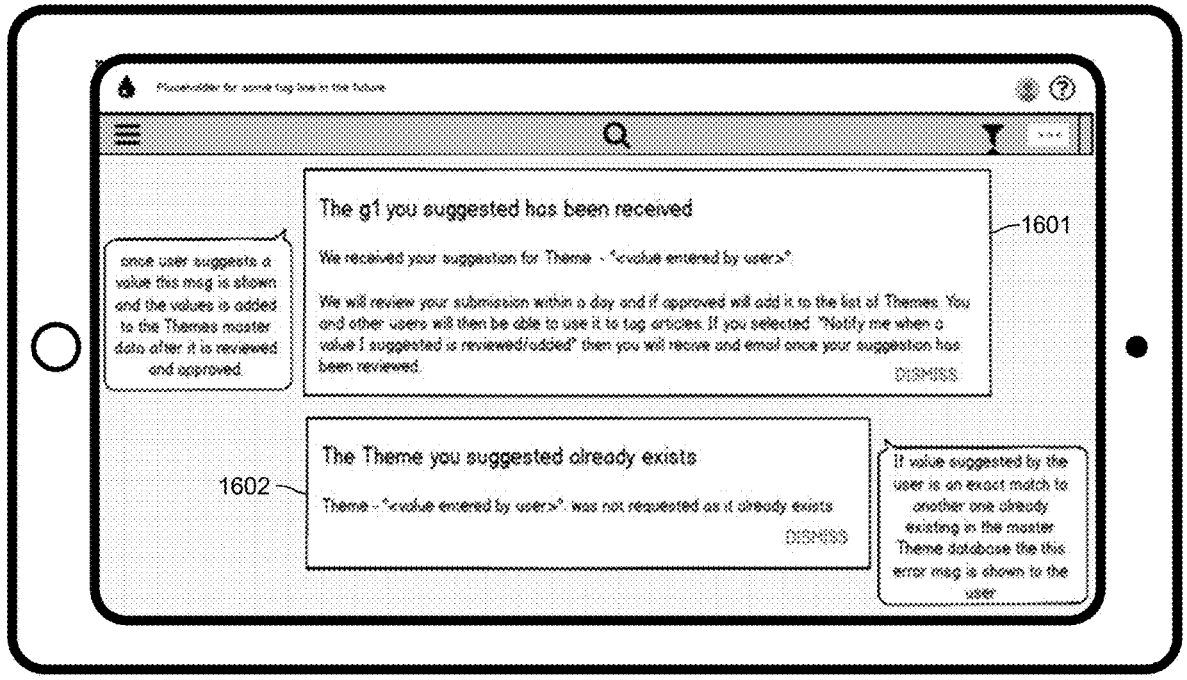
FIG. 33 shows a view and suggest new themes response interface.

FIG. 33 shows a view and suggest new themes response interface. On this interface, once a user suggests a new value on the view and suggest new themes interface and clicks the suggest button (see FIG. 32), the system displays a window based on the data entered by the user. If the value suggested by the user is not an exact match to an existing value in the master database, then the system displays the text box shown in 1601. If the user suggests a value that is an exact match of one currently existing in the master database, then the system displays the text window 1602.

Although certain specific embodiments are described above for instructional purposes, the teachings of this patent document have general applicability and are not limited to the specific embodiments described above. The function of the VNAS 28 illustrated in FIG. 3 can be implemented in hardware circuitry as shown, or in a combination of dedicated hardware circuitry and software, or largely in software. This applies to individual blocks or portions of the diagrams. For example, an article validation module such as the article validation module 31 can be a hardware article validation module, or can be an article validation module 31 implemented in software code. Likewise, a VNA processing module such as the VNA processing module 30 can be a hardware VNA processing module, or can be a VNA processing module implemented in software code. Certain of the illustrated blocks can be implemented with dedicated hardware and other ones of the blocks can be implemented in software. Accordingly, various modifications, adaptations, and combinations of various features of the described embodiments can be practiced without departing from the scope of the invention as set forth in the claims.

What is claimed is:

1. A method comprising:
(a) maintaining a Visual News Analysis (VNA) database that stores a plurality of links to external webpages, wherein the VNA database is part of a VNA System (VNAS), wherein for each of the links, the maintaining of (a) involves storing a description of the external webpage that is associated with the link and also involves storing a plurality of attributes that is associated with the link, wherein for each of the links, the plurality of attributes that is associated with the link comprises a user generated portion of attributes and a system generated portion of attributes, wherein the user generated portion of attributes is obtained from user input supplied to the VNAS, wherein the VNA database stores a share score for each user generated attribute, wherein the share score indicates how commonly shared a user generated attribute is shared among users commenting on the external webpage, wherein a display size of each user generated attribute is determined based on the share score, wherein the system generated portion of attributes is obtained by extracting attributes from external webpages, wherein the VNA database stores a relevancy score for each system generated attribute, wherein the relevancy score indicates relevance between a system generated attribute and contents of the external webpage, and wherein a display size of each system generated attribute is determined based on the relevancy score; and (b) dynamically presenting a first content segment to a user on a display, wherein the first content segment has a first amount of content, a first plurality of selectable attributes and a first link to a first external webpage, and wherein the first amount of content, the first plurality of selectable attributes and the first link are generated by the VNAS from information stored in the VNA database.

2. The method of claim 1, wherein the first plurality of selectable attributes comprises a first selectable attribute and a second selectable attribute, wherein the first selectable attribute has a larger share score or relevancy score than the second selectable attribute, and wherein the first selectable attribute is displayed larger and more prominently as compared to the second selectable attribute.

3. The method of claim 1, wherein in response to detecting that the user selected one of the selectable attributes, the VNAS identifies links stored in the VNA database that match the selectable attribute selected by the user, and wherein the VNAS generates and dynamically presents a plurality of content segments from the identified links such that the plurality of content segments includes at least two content segments having a same selectable attribute.

4. The method of claim 1, wherein at least one of the selectable attributes includes an amount of text along with an associated graphical element.

5. The method in claim 1, wherein a content segment includes at least one of: an amount of text associated with the first external webpage, an image associated with the first external webpage, or an amount of video associated with the first external webpage.

6. The method of claim 1, further comprising:
(c) dynamically presenting a second content segment to the user on the display, wherein the second content segment has a second amount of content, a second plurality of selectable attributes and a second link to a second external webpage, and wherein the second amount of content, the second plurality of selectable attributes and the second link are generated by the VNAS from information stored in the VNA database.

7. The method of claim 6, wherein the first external webpage is different from the second external webpage.

8. The method of claim 1, further comprising:
(c) receiving webpage information of an external webpage from the user onto the VNAS;
(d) updating the VNA database in accordance with the webpage information received in (c); and
(e) dynamically presenting a second content segment using the webpage information received in (c).

9. The method of claim 8, wherein the webpage information received in (c), includes a URL (Universal Resource Locator) and at least one attribute provided by the user.

10. The method of claim 8, wherein the updating of (d) involves extracting from the webpage of (a) at least one item taken from the group consisting of: title information of the webpage, textual information that is descriptive of the webpage, an excerpt of the webpage, an image of the webpage, an amount of video of the webpage, concept information of the webpage, entity information of the webpage, topical information of the webpage, and validation of that the webpage is genuine.

11. The method of claim 1, further comprising:
(c) dynamically presenting a plurality of content segments having a common selectable attribute, wherein the dynamically presenting of (c) occurs in response to the VNAS detecting that the user has selected the common selectable attribute.

12. The method of claim 11, wherein the dynamically presenting of (c) involves identifying links stored in the VNA database that match the common selectable attribute that was selected by the user.

13. A Visual News Analysis System (VNAS) comprising:
a Visual News Analysis (VNA) database that stores a plurality of links to external webpages, wherein for each of the links, the VNA stores a plurality of attributes and a weight associated with each of the attributes, wherein for each of the links, the attributes that are associated with the link comprise a user generated portion of attributes and a system generated portion of attributes, wherein the user generated portion of attributes is obtained from user input supplied to the VNAS, wherein the system generated portion of attributes is obtained by extracting attributes from external webpages, wherein the VNA database stores a share score for each user generated attribute, wherein the share score indicates how commonly shared a user generated attribute is shared among users commenting on an associated external webpage, wherein a display size of each user generated attribute is determined based on the share score, wherein the VNA database stores a relevancy score for each system generated attribute, wherein the relevancy score indicates relevance between a system generated attribute and contents of the external webpage, and wherein a display size of each system generated attribute is determined based on the relevancy score; and
a VNA processing module that supplies a VNA platform webpage to a user, wherein the VNA platform webpage is rendered on a display of a device, and wherein the VNA processing module causes at least one content segment to be dynamically displayed on the display of the device such that the user can drag portions of the content segment across the display, wherein the content segment has an amount of content, a plurality of selectable attributes and a link to an external webpage, and wherein the amount of content, the plurality of selectable attributes and the link are generated by the VNA processing module using information stored in the VNA database.

14. The VNAS of claim 13, wherein the a VNA processing module comprises:
an article validation module, wherein the article validation module determines whether an external webpage to be stored in the VNA database is from a valid source;
an external content aggregation module, wherein the external content aggregation module extracts text, image, and video information from an external webpage to be stored in the VNA database;
a user management module, wherein the user management module is used to manage user information and track user behavior; and
a concept and entity extraction module, wherein the concept and entity extraction module is externally or internally from the system, and wherein the concept and entity extraction module obtains at least one concept information or entity information in connection with an external webpage to be stored in the VNA database.

15. The VNAS of claim 13, wherein selectable attributes comprises a first selectable attribute and a second selectable attribute, wherein the first selectable attribute has a larger share score or relevancy score than the second selectable attribute, and wherein the first selectable attribute is displayed larger and more prominently as compared to the second selectable attribute.

16. The VNAS of claim 13, wherein the VNA processing module identifies links stored in the VNA database that match a selectable attribute selected by the user in response to detecting that the user selected the selectable attribute, and wherein the VNAS processing module generates and dynamically presents a plurality of content segments from the identified links such that the plurality of content segments have selectable attributes that match the selectable attribute selected by the user.

17. The VNAS of claim 13, wherein at least one of the selectable attributes includes an amount of text along with an associated graphical element.

18. The VNAS of claim 13, wherein a content segment includes an amount of text associated with the first external webpage, and an image associated with the first external webpage.

19. A system comprising:
- a Visual News Analysis (VNA) database that stores a plurality of links to external webpages, wherein for each of the links, the VNA stores a plurality of attributes and a weight associated with each of the attributes, wherein for each of the links, the attributes that are associated with the link comprise a user generated portion of attributes and a system generated portion of attributes, wherein the user generated portion of attributes is obtained from user input, wherein the system generated portion of attributes is obtained by extracting attributes from external webpages, wherein the VNA database stores a share score for each user generated attribute, wherein the share score indicates how commonly shared a user generated attribute is shared among users commenting on an associated external webpage, wherein a display size of each user generated attribute is determined based on the share score, wherein the VNA database stores a relevancy score for each system generated attribute, wherein the relevancy score indicates relevance between a system generated attribute and contents of the external webpage, and wherein a display size of each system generated attribute is determined based on the relevancy score; and
- means for dynamically displaying at least one content segment on a display of a device such that a user can drag portions of the content segment across the display, wherein the content segment has an amount of content, a plurality of selectable attributes and a link to an external webpage, wherein the amount of content, the plurality of selectable attributes and the link are generated by the means using information stored in the VNA database, and wherein each of the selectable attributes has an associated weight.

20. The system of claim 19, wherein the means for dynamically displaying is a Visual News Analysis (VNA) processing module that operates as part of a virtual network appliance.

* * * * *